(12) United States Patent
Kim et al.

(10) Patent No.: US 9,671,888 B2
(45) Date of Patent: Jun. 6, 2017

(54) DISPLAY DEVICE HAVING TOUCH SENSOR AND DRIVING METHOD THEREOF

(71) Applicant: LG Display Co., Ltd., Seoul (KR)

(72) Inventors: Hongchul Kim, Gunpo-si (KR); Inhyuk Song, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 10 days.

(21) Appl. No.: 14/975,647

(22) Filed: Dec. 18, 2015

(65) Prior Publication Data

US 2017/0108970 A1   Apr. 20, 2017

(30) Foreign Application Priority Data

Oct. 20, 2015   (KR) .................. 10-2015-0146042

(51) Int. Cl.
*G06F 3/041* (2006.01)
*G09G 3/20* (2006.01)

(52) U.S. Cl.
CPC .......... *G06F 3/0412* (2013.01); *G06F 3/0416* (2013.01); *G09G 3/2092* (2013.01); *G09G 2300/0439* (2013.01); *G09G 2310/0243* (2013.01)

(58) Field of Classification Search
CPC ............................... G06F 3/0418; G06F 3/041
USPC ........................................................ 345/173
See application file for complete search history.

(56) References Cited

U.S. PATENT DOCUMENTS

| | | | |
|---|---|---|---|
| 2011/0210927 A1* | 9/2011 | Mizuhashi | G06F 3/044 345/173 |
| 2012/0050217 A1 | 3/2012 | Noguchi et al. | |
| 2013/0009888 A1 | 1/2013 | Park et al. | |
| 2013/0038378 A1* | 2/2013 | Singh | G06F 3/044 327/517 |
| 2013/0069894 A1* | 3/2013 | Chen | G06F 3/0412 345/173 |
| 2013/0176251 A1* | 7/2013 | Wyatt | G09G 5/18 345/173 |
| 2013/0321332 A1* | 12/2013 | Yoshimura | G06F 3/0418 345/174 |

(Continued)

FOREIGN PATENT DOCUMENTS

EP   2874145 A1   5/2015

OTHER PUBLICATIONS

European Extended Search Report, European Application No. 15202405.5, May 24, 2016, 9 pages.

*Primary Examiner* — Ariel Balaoing
(74) *Attorney, Agent, or Firm* — Fenwick & West LLP

(57) ABSTRACT

A method for driving a display device including a display panel including a first and a second display area each of which is divided into a plurality of display blocks and n touch blocks comprises a first and a second step. The first step drives the respective display blocks of the first display area sequentially, drives at least one touch block after driving the display blocks, and generates a first touch report after driving all of the n touch blocks. The second step drives the respective display blocks of the second display area sequentially, drives at least one touch block after driving the display blocks, and generates a second touch report after driving the n touch blocks again. The first and the second step are processed within one frame period, and the one frame period includes a vertical blanking interval void of input image data.

29 Claims, 20 Drawing Sheets

(56) References Cited

U.S. PATENT DOCUMENTS

| | | | |
|---|---|---|---|
| 2014/0340349 A1 | 11/2014 | Liu et al. | |
| 2015/0097799 A1* | 4/2015 | Buuck | G06F 3/0418 345/173 |
| 2015/0227254 A1* | 8/2015 | Kim | G06F 3/0416 345/174 |
| 2015/0355762 A1* | 12/2015 | Tripathi | G06T 1/20 345/173 |

* cited by examiner

Fig. 13
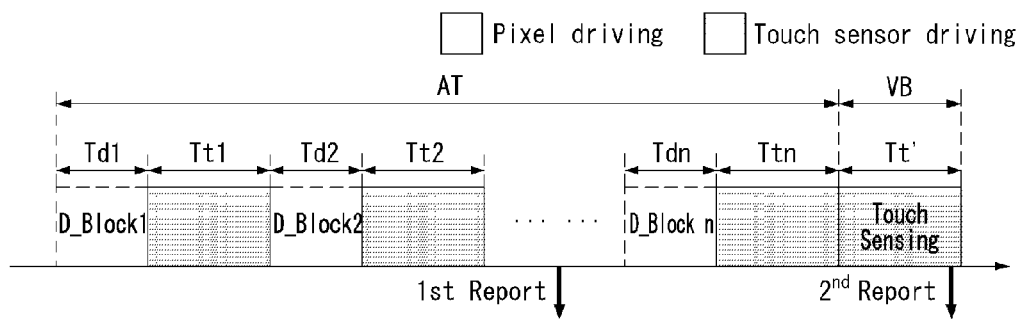
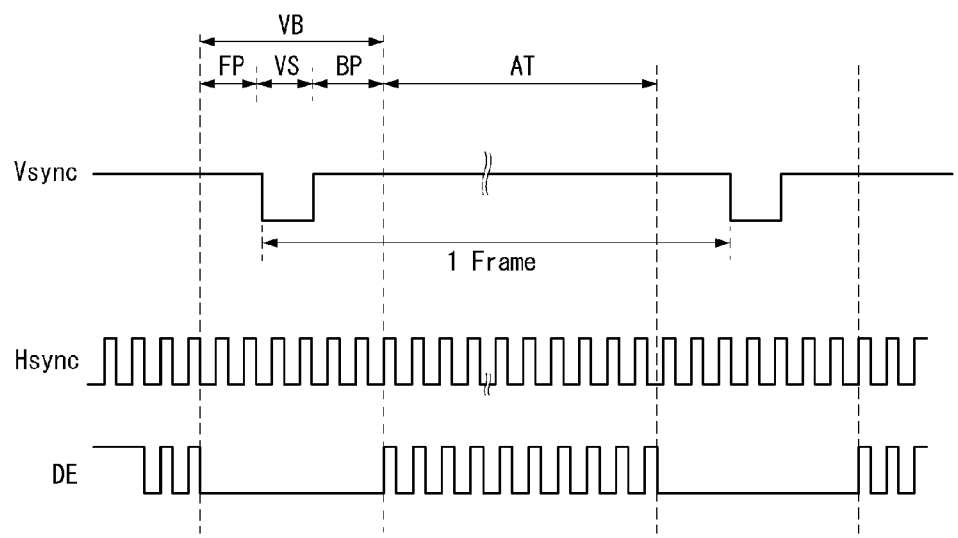

DISPLAY DEVICE HAVING TOUCH SENSOR AND DRIVING METHOD THEREOF

This application claims the benefit of Republic of Korea Patent Application No. 10-2015-0146042 filed on Oct. 20, 2015, the entire contents of which is incorporated herein by reference for all purposes as if fully set forth herein.

BACKGROUND OF THE INVENTION

Field of the Disclosure

The present disclosure is related to a display device having a touch sensor embedded therein and a method for driving the display device.

Discussion of the Related Art

Along with advancement of multimedia contents and in accordance with the needs for display devices capable of displaying the multimedia contents, flat panel display devices are nowadays being developed actively, which are characterized by a bigger display area, low cost, and high display quality (such as video expression, resolution, brightness, contrast, and color reproduction). These flat panel display devices are equipped with various kinds of input devices such as a keyboard, mouse, trackball, joystick, and digitizer as an interface for a user. However, to use the aforementioned input devices requires learning how to use them and incurs inconvenience as they occupy space for installation and operation thereof, thereby preventing high quality flat panel display products from coming to market. Therefore, there is a growing demand for an input device for display devices which is easy to use, simple, and capable of reducing malfunction. To meet the demand, a touch sensor has been proposed, which is capable of recognizing information input by a user touching the screen of a display device with his/her hand or pen or putting his/her hand or pen in close proximity to the screen.

A touch sensor used for a display device is often implemented by In-Cell method which embeds the touch sensor inside the display panel. A display device employing the in-cell touch method shares a touch electrode of the touch sensor and a common electrode of the display panel; and uses a display time and a touch sensing time interchangeably according to a time division scheme. Since the display panel and the touch sensor are driven by a time division scheme, operating time is not sufficiently secured. Moreover, as the operating time for the touch sensor is shortened, it is likely that touch sensitivity is degraded accordingly. In order to drive a touch sensor in a reliable manner, it is important to reduce a display time; however, if the display time is reduced, video display quality is degraded in return.

SUMMARY OF THE INVENTION

A method for driving a display device according to an embodiment of the present invention comprises a first step of writing current frame data to a first display area of a display unit and generating a first touch report including coordinate information of the touch input area by driving a first and a second touch group simultaneously; and a second step of writing the current frame data to a second display area of the display unit and generating a second touch report including coordinate information of the touch input area by driving the first and the second touch group again.

A touch IC according to the present invention generates a first touch report including coordinate information of the touch input area by driving a first and a second touch group simultaneously within a first period of a first frame period; and generates a second touch report including coordinate information of the touch input area by driving the first and the second touch group again within a second period of the first frame period.

A display device according to the present invention comprises a display panel of which the display unit is divided into a plurality of display areas and of which the touch screen is divided into a plurality of touch groups; a display panel driving unit writing current frame data into a first display area at the first step and writing the current frame data into a second display area at the second step; and a touch sensor driving unit generating a first touch report including coordinate information of the touch input area by driving a first and a second touch group at the first step and generating a second touch report including coordinate information of the touch input area by simultaneously driving the first and the second touch group again at the second step.

In one embodiment, a touch sensitive display device and method operating the touch sensitive display device is disclosed. The device comprises a display panel including a plurality of pixels having at least a first block of pixels, a second block of pixels, the display panel being driven in a first frame period that includes a vertical active period and a vertical blanking period. The device also comprises driver circuitry such as a driver integrated circuit. The driver circuitry drives display data to the first block of pixels during a first display period within the vertical active period. The driver circuitry drives one or more touch driving signals to one or more first touch electrodes during a first touch period within the vertical active period. The driver circuitry drives display data to the second block of pixels during a second display period within the vertical active period. The driver circuitry drives one or more touch driving signals to one or more second touch electrodes during a second touch period. The second touch period has at least a first part occurring in the vertical active period and a second part occurring in the vertical blanking period.

In one embodiment the second part of the second touch period occurs during a front porch of the vertical blanking period. The second part of the second touch period may occur during a vertical synchronization portion of the vertical blanking period. The second part of the second touch period may also occur during a back porch of the vertical blanking period.

In one embodiment, the first touch electrodes are same as the second touch electrodes. In other embodiments the first touch electrodes are different from the second touch electrodes.

In one embodiment the driver circuitry generates a first touch report based on the touch driving signals driven during the first touch period, and generates a second touch report based on the touch driving signals driven during the second touch period. The second touch report is generated during the vertical blanking period of the first frame period. Alternatively, the second touch report is generated during a second frame period that follows the first frame period.

In one embodiment the driver circuitry drives the touch driving signals simultaneously to both the one or more first touch electrodes and one or more second touch electrodes during the first touch period. The driver circuitry also drives the touch driving signals simultaneously to both the one or more first touch electrodes and the one or more second touch electrodes during the second touch period.

In one embodiment, the driving circuitry drives the one or more touch driving signals to all touch electrodes of the display panel during the first touch period. The driving circuitry also drives the one or more touch driving signals to all touch electrodes of the display panel during the second touch period.

In one embodiment, the vertical blanking period corresponds to a period of time in the first frame period when input image data is not received by the touch sensitive display device, and the vertical active period corresponds to a remainder of the first frame period other than the vertical blanking period.

In one embodiment the first touch period is after the first display period, the second display period is after the first touch period, and the second touch period is after the second display period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 13 illustrates a driving method according to a second embodiment.

DETAILED DESCRIPTION OF THE INVENTION

Figure 1:
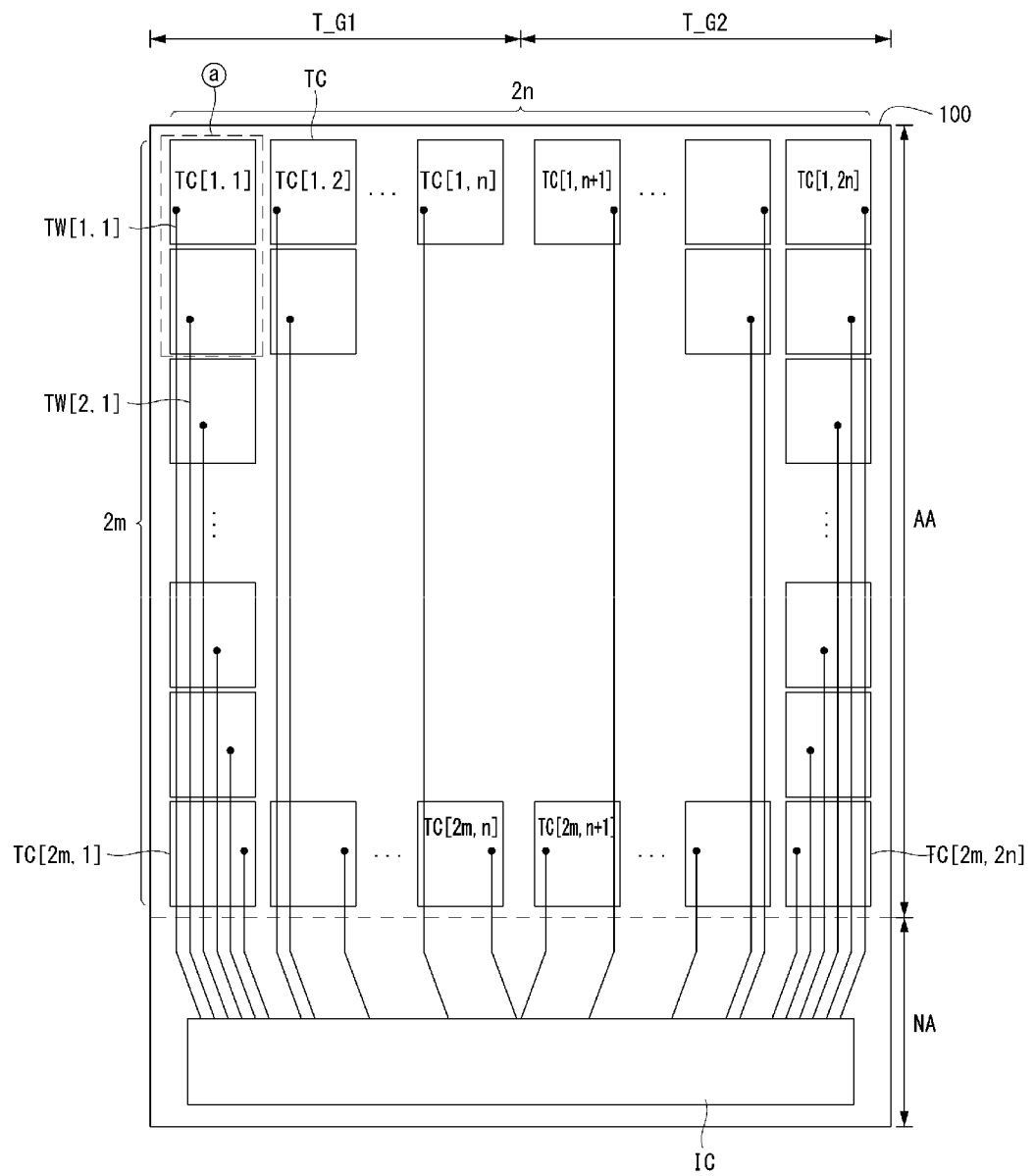
FIG. 1 illustrates a touch sensor embedded display device according to the present invention.

A display device according to the present invention can be implemented by a flat panel display device such as a Liquid Crystal Display (LCD), Field Emission Display (FED), Plasma Display Panel (PDP), Organic Light Emitting Display (OLED), or Electrophoresis (EPD). LCD is used as one example of a flat panel display device in the embodiments below, but the present invention can be implemented by using any display device as long as touch sensors can be embedded in a pixel array; therefore, it should be noted that the present invention is not limited to the LCD. To enhance a sense of touch felt by a user from a touch screen, the present invention increases a touch report rate. A touch report rate refers to the frequency at which coordinate data obtained by sensing all of touch sensors within a touch screen are transmitted to an external host system. The host system updates coordinates of a touch input at a frequency of the touch report rate. The system response speed of the host system with respect to a touch input is proportional to the touch report rate. The higher the touch report rate, the faster the speed for updating coordinates of a touch input; therefore, a higher touch report rate can facilitate a sense of touch felt by the user and express a touch input trajectory in a precise manner.

In one embodiment, a display device performs time-division on a time period for driving pixels within one frame period and a time period for driving touch sensors; and generates touch input coordinates at a touch report rate higher than a display frame rate. The display frame rate refers to the frequency at which all of the pixels within a display panel are updated with new data. For example, when the display frame rate is 60 Hz, the touch report rate becomes 60×I (where I is a positive integer larger than or equal to 2). In what follows, embodiments are described with an example where the touch report rate is two times higher than the display frame rate, but the present disclosure is not limited to the example. For example, by reducing the number of sensors disposed on a screen and increasing the number of touch groups divided within the touch screen by 2 or more, the touch report rate can be made to be higher than the frame rate two times or more.

It is difficult to increase the touch report rate if touch sensors are driven within Vertical Active Time (AT) defined within one frame period. In order to increase the touch report rate while touch sensors are driven within the AT, a display time during which pixels are driven is further decreased; therefore, the memory clock frequency of the driving circuit unit has to be increased, and charging time for the pixels has to be reduced. An embodiment of a display device divides a touch screen into two or more groups, drives touch sensors of the groups at the same time, and uses a Vertical Blanking Period (VB) during which no input image is applied as a touch sensor driving period. Therefore, the present invention can increase the touch report rate without reducing the driving memory clock frequency and charging time for pixels.

Figure 2:
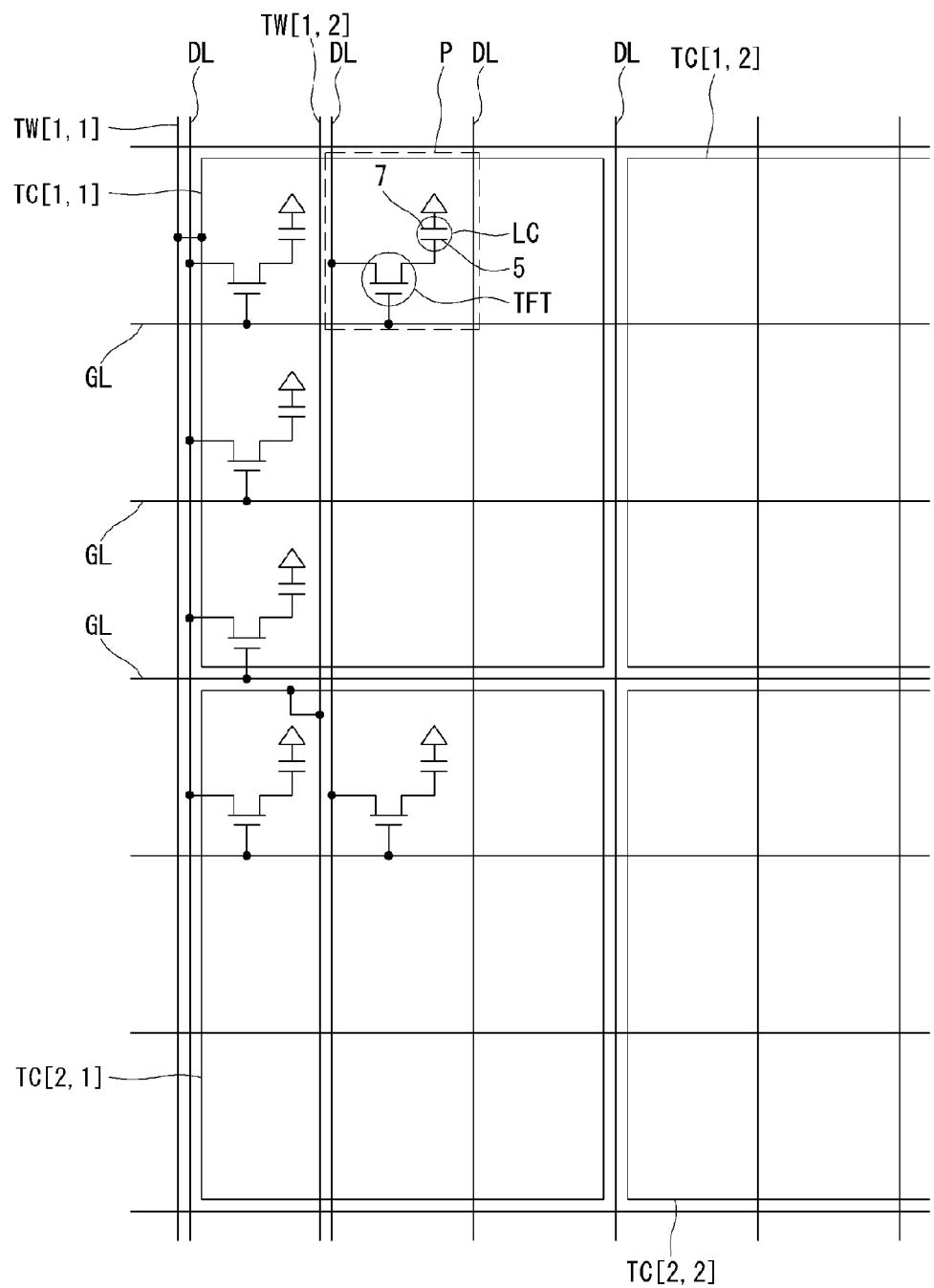
FIG. 2 illustrates touch sensors and pixels by magnifying part of a display unit of a display panel.

FIG. 1 illustrates a touch sensor embedded display device according to the present invention, and FIG. 2 illustrates pixels included in the touch sensor. Although touch sensors and sensing lines in FIGS. 1 and 2 use separate drawing symbols, they will be collectively called a touch sensor (TC) and sensing line (TW) in detailed descriptions without distinguishing their positions in the respective structures.

With reference to FIG. 1, a touch sensor embedding type display device according to the present invention includes a display panel 100 and a driving circuit unit (IC).

Figure 3:
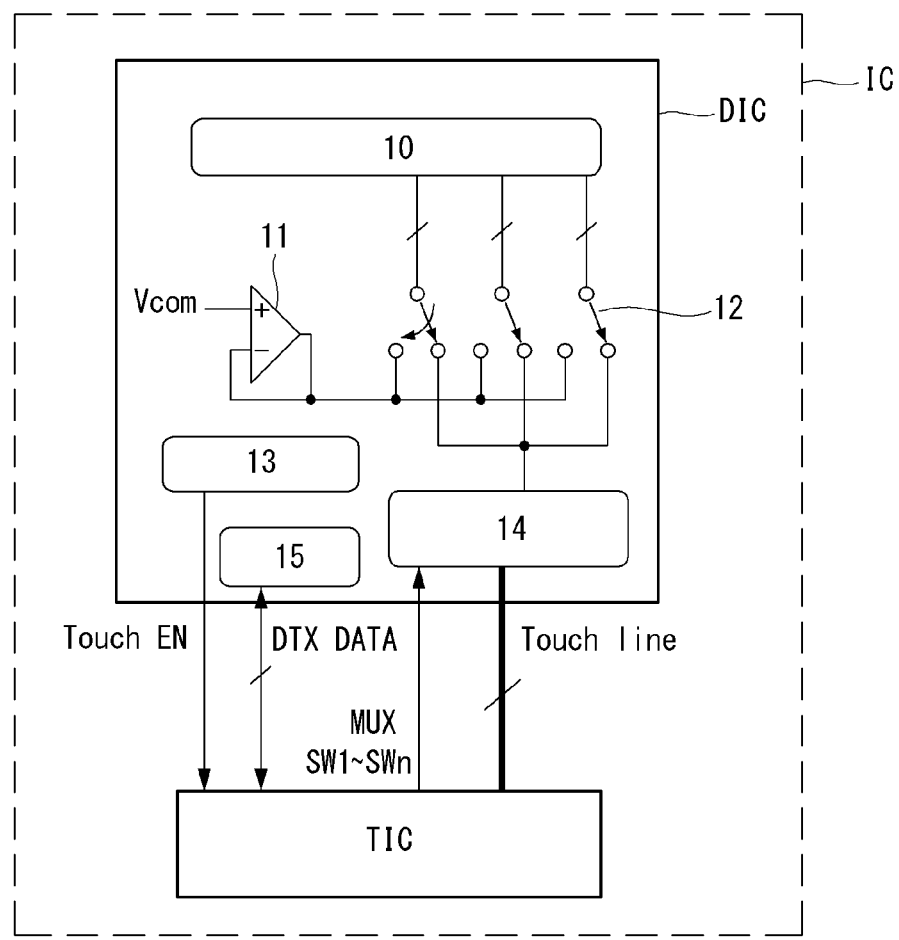
FIGS. 3 to 5 show embodiments of a driving circuit unit.
Figure 4:
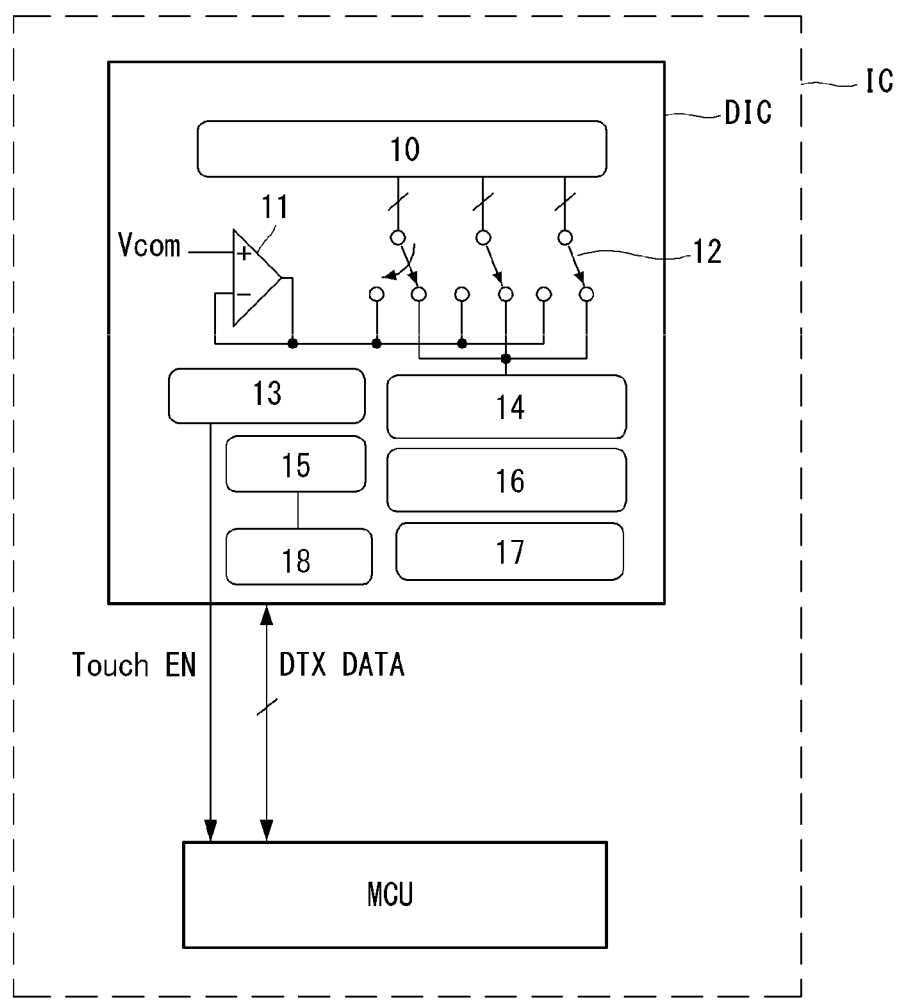
Figure 5:
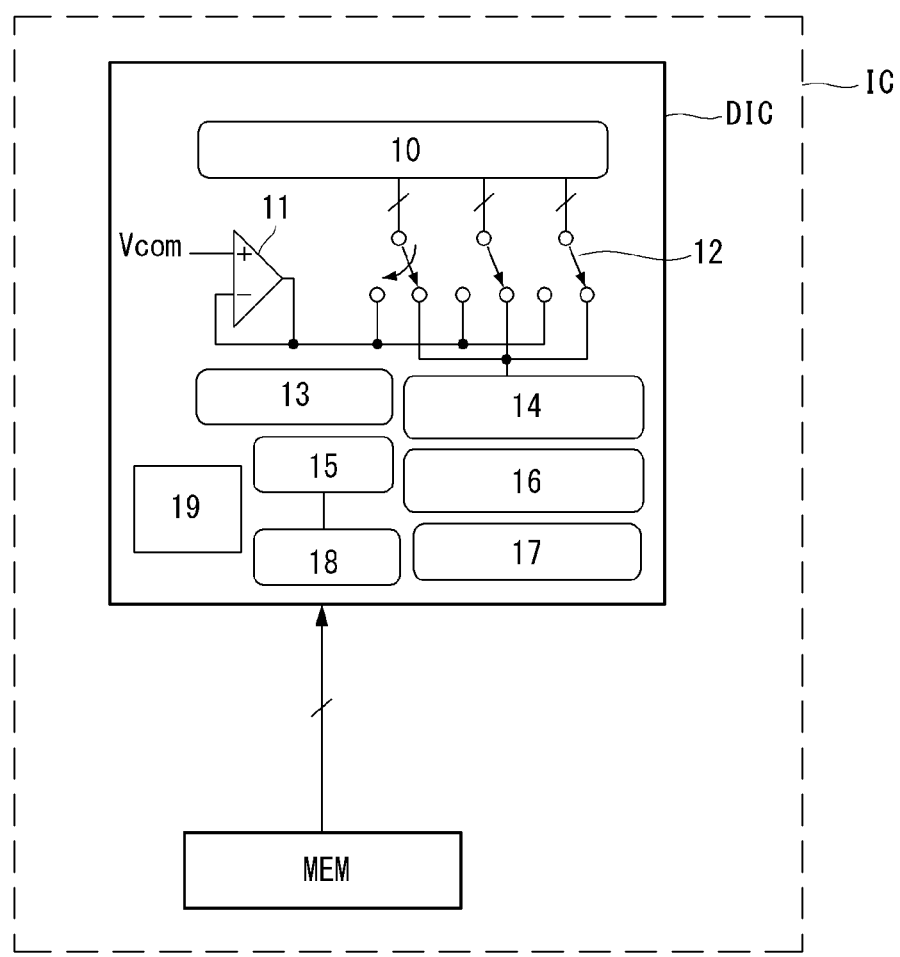

The display panel 100 includes a display area AA and a non-display area NA. In the display are AA, pixels P for displaying image information and touch sensors (TC) are disposed. The non-display area AA is disposed outside the display area AA. In the non-display area AA, a driving circuit unit IC is disposed as shown in FIGS. 3 to 5. The driving circuit unit IC includes a multiplexer (in what follows, it is called a "MUX").

The display panel 100 includes a upper substrate and a lower substrate which face to each other and have a Liquid Crystal (LC) layer located between them.

Referring to FIG. 2, the pixel array of the display panel 100 comprises data lines (DLs), gate lines (GLs), thin film transistor (TFT) formed in a cross section between the DLs and the GLs, a pixel electrode 5 connected to the TFT, and storage capacitor (Cst) connected to the pixel electrode 5. The TFT, being turned on in response to a gate pulse from the GL, provides data voltage applied through the DL to the pixel electrode 5. The LC layer is driven by a voltage difference between the data voltage charged by the pixel electrode 5 and common voltage (Vcom) applied to the common electrode 7 and is used to adjust the amount of penetrating light.

The touch sensor (TC) is connected to a plurality of pixels, which is implemented as a capacitance-type sensor to detect a touch input. Touch sensors (TCs) are divided into a first touch group (T_G1) and a second touch group (T_G2). The first touch group (T_G1) comprises touch sensors of the first column TC[1,1] up to the touch sensors of the n-th column TC[1,N], while the second touch group (T_G2) comprises touch sensors of the (n+1)-th column TC[1, n+1] to the touch sensors of the 2n-th column TC[1, 2n]. The first and the second touch group T_G1, T_G2 of FIG. 1 are assumed to be of the same size and to have the same number of touch sensors, but the present invention is not limited to the assumption above. For example, the first and the second touch group T_G1, T_G2 can have different sizes, and the number of touch sensors belonging to the first touch group T_G1 can be different from the number of touch sensors belonging to the second touch group T_G2. Each touch sensor TC overlaps a plurality of pixels (P) and is connected to the pixels (P). Therefore, a common voltage Vcom can be provided to a plurality of pixels P through one touch sensor TC during the display time in which the pixels P are driven.

FIG. 2 illustrates one example where 9 pixels P arranged in a 3×3 matrix form are disposed within one touch sensor TC. The touch sensor TC provides a common voltage Vcom to pixels P during the display time in which the pixels P are driven. And the touch sensor TC, being driven by a touch driving signal Tdrv during a touch sensing time, senses a touch input. The common electrode 7 is divided in units of touch sensor (TC). In the example of FIG. 2, the common electrode 7 is divided by the size of 3×3 pixels and connected to the pixels. One common electrode 7 divided as above is used as one touch sensor electrode. The sensing line of the first row and first column TW[1, 1] is connected to the touch sensor at the first row, first column position TC[1, 1]; and the sensing line of the first row and second column TW[1, 2] is connected to the touch sensor at the first row, second column position TC[1, 2].

Since a touch sensor is connected to pixels, the pixels are electrically coupled to the touch sensor. Therefore, as the pixels and the touch sensor cannot be driven at the same time, one frame period is divided into a display time during which pixels are driven to write in data of an input image and a touch sensing time during which touch sensors are driven with touch driving signals. In the display field, a frame denotes a single image displayed on a pixel array of a display device. One frame period corresponds to a time period during which one frame amount of input image data are input to a display device, and one frame data are all written to the entire pixels of the pixel array.

The non-display area (NA) is disposed outside the display area (AA), where a driving circuit unit (IC) for driving a data line (DL) and a gate line (GL) is disposed.

The driving circuit unit (IC) comprises a display driving unit which writes data of an input image to the pixels (P) and a touch (IC) which senses a touch input based on a capacitance change of the touch sensor (TC). The driving circuit unit (IC) can be integrated into a drive IC by incorporating a driving unit, a gate driving unit, a timing controller, and a module power unit thereto.

The data driving unit receives image data from the timing controller, converts the image data to positive polarity/negative polarity gamma compensation voltage, and outputs a positive polarity/negative polarity data voltage. The data voltage is supplied to data lines (DLs).

The gate driving unit provides gate pulses sequentially to gate lines (GLs) under the control of the timing controller. A gate pulse output from the gate driving unit is synchronized with the data voltage. The gate driving unit can be formed on a lower substrate of the display panel 100 together with a pixel array through Gate-In-Panel (GIP) process.

The timing controller receives timing signals synchronized with the data of an input image. Timing signals include a vertical synchronization signal (Vsync), horizontal synchronization signal (Hsync), data enable signal (DE), and main clock (CLK). The timing controller controls operation timing of driving circuit such as the data driving unit and gate driving unit by using the timing signals (Vsync, Hsync, DE, CLK).

The module power unit includes a DC-DC converter. The module power unit adjusts an input voltage supplied from a host system (not shown) and generates a driving voltage of the display panel 100. The DC-DC converter generates a positive polarity/negative polarity gamma voltage (VDH, VDL), gate high voltage (VGH), gate low voltage (VGL), common voltage (Vcom), and logic power voltage (Vcc) by using a PWM modulation circuit, boost converter, regulator, charge pump, and so on. The gate high voltage (VGH) is a high voltage of a gate pulse set to be larger than a threshold voltage of TFTs formed in a pixel array and a gate driving unit; and a gate low voltage (VGL) is a low voltage of the gate pulse set to be smaller than the threshold voltage of TFTs. The common voltage (Vcom) is supplied to the common electrode 7 of liquid crystal cells (Clc). The positive polarity/negative polarity gamma voltage (VDH, VDL) is divided by a voltage divider circuit according to gradation level and is input to the a Digital-to-Analog Converter (DAC) of the data driving unit. The DAC selects a voltage level of the positive polarity/negative polarity gamma voltage according to digital data and generates a data voltage. The module power unit can adjust an output voltage by varying the frequency (or step-up frequency) of a PWM signal according to a reference frequency input from the timing controller.

The driving circuit unit (IC) can further comprise a backlight driving unit. The driving circuit unit (IC) adjusts backlight brightness by varying the duty ratio of a dimming signal according to an input image. The dimming signal is generated in the form of a Pulse Width Modulation (PWM) signal.

The driving circuit unit (IC) according to the present invention can be implemented in the form as shown in FIGS. 3 to 5.

With reference to FIG. 3, the driving circuit unit (IC) includes a drive IC (DIC) and a touch IC (TIC).

The drive IC (DIC) comprises a touch sensor channel unit 10, Vcom buffer 11, switch array 12, timing control signal generation unit 13, MUX 14, and DTX compensation unit 15.

The touch sensor channel unit 10 is connected to the touch sensor (TC from FIG. 1/2) through a sensing line (TW from FIG. 1/2) and connected to the Vcom buffer 11 and MUX 14 through the switch array 12. The MUX 14 connects the sensing line (TW) to the touch IC (TIC). In the case of n:1 MUX, the MUX 14 reduces the number of channels of the touch IC (TIC) by time multiplexing one channel of the touch IC (TIC) to n sensing lines (TWs). The MUX 14 selects sensing lines to be connected to the channel of the touch IC (TIC) in response to a MUX control signal (SW1-SWn). The MUX 14 is connected to the channels of the touch IC (TIC) through touch lines.

The Vcom buffer 11 outputs a common voltage (Vcom) for pixels. The switch array 12 supplies the common voltage (Vcom) from the Vcom buffer 11 to the touch sensor channel unit 10 during a display time under the control of the timing controller 13. The switch array 12 connects sensing lines (SLs) to the touch IC (TIC) during the touch time under the control of the timing control signal generation unit 13.

The timing controller 13 generates timing control signals for controlling operation timing of the display driving circuit and touch IC (TIC). The display driving unit (not shown) includes a data driving unit and a gate driving unit for writing data of an input image into pixels. The data driving unit generates a data voltage and supplies the generated data voltage to the data lines of the display panel. The data driving unit can be integrated into the driving IC (DIC). The data driving unit provides gate pulses (or scan pulses) synchronized with the data voltage sequentially to the gate lines of the display panel. The gate driving unit can be disposed on the substrate of the display panel together with pixels.

The timing controller 13 synchronizes the display driving circuit and the touch IC (TIC) by generating a touch enable signal (Touch EN) which defines a display time and a touch time. The display driving unit writes data to pixels during a first level period of the touch enable signal (Touch EN). The touch IC (TIC) senses a touch input by driving touch sensors in response to a second level of the touch enable signal (Touch EN). The first level of the touch enable signal (Touch EN) may be low level, and the second level may be high level, but vice versa.

The DTX compensation unit 15 analyzes data of an input image, removes a noise component from the data (TDATA, not shown) according to a gradation change of the input image by using a touch input, and transmits the noise-removed input image data to the touch IC (TIC). The term DTX denotes Display and Touch crosstalk. The DTX compensation unit 15 is not needed for such a kind of system where noise in the touch sensor does not change sensitively according to the change of input image data and thus can be omitted. In FIG. 3, DTX DATA correspond to output data of the DTX compensation unit 15. One example of a DTX compensation method can be the method disclosed in the Korea Patent Application 10-2014-0079689 applied by the present applicant.

The touch IC (TIC) drives the MUX 14 during the touch time in response to the touch enable signal (Touch EN) from the timing controller 13 and receives charges of the touch sensor through the MUX 14 and the sensing lines (TWs).

The touch IC (TIC) detects an amount of variation of charges before and after the touch input from the received signal of the touch sensor, compares the amount of charge variation with a predetermined threshold value, and determines positions of touch sensors exhibiting an amount of charge variation larger than the threshold value as a touch input area. The touch IC (TIC) calculates coordinates of each touch input and transmits touch data including touch input coordinate information to an external host system. The touch data may be part of a touch report. The touch IC (TIC) includes an amplifier amplifying charges of the touch sensor, an integrator accumulating charges received from the touch sensor, an Analog-to-Digital Converter (ADC) converting the integrator voltage to digital data, and a computational logic unit. The computational logic unit carries out a touch recognition algorithm which compares touch raw data output from the ADC with a threshold value, determines a touch input according to the comparison result, and calculates coordinates of the touch input.

The drive IC (DIC) and the touch IC (TIC) can transmit and receive signals through a Serial Peripheral Interface (SPI).

The host system refers to the main system of an electronic device to which the display device of the present invention can be applied. The host system can be one from among a phone system, television system, set-top box, navigation system, DVD player, Blu-ray player, personal computer, and home theater system. The host system transfers input image data to the drive IC (DIC), receives touch input data from the touch IC (TIC), carries out an application associated with the touch input.

With reference to FIG. 4, the driving device includes a drive IC (DIC) and a Micro Controller Unit (MCU).

The drive IC (DIC) comprises a touch sensor channel unit 10, Vcom buffer 11, switch array 12, first timing control signal generation unit 13, MUX 14, DTX compensation unit 15, sensing unit 16, second timing control signal generation unit 17, and memory 18. The present embodiment differs from the embodiment of FIG. 3 in that the sensing unit 16 and the second timing controller 17 are integrated into the drive IC (DIC). The first timing controller 13 is actually the same as that of FIG. 3. Therefore, the first timing controller 13 generates timing control signals for controlling operation timing of the display driving circuit and the touch IC (TIC).

The sensing unit 16 comprises an amplifier amplifying charges of a touch sensor, an integrator accumulating charges received from the touch sensor, an ADC converting an integrator voltage to digital data. Touch raw data (TDATA) output from the ADC are transmitted to the MCU. The second timing controller 17 generates a timing control signal, clock, and so on for controlling operation timing of the MUX 14 and the sensing unit 16. The DTX compensation unit 15 can be omitted within the drive IC (DIC). The memory 18 temporarily stores the TDATA under the control of the second timing controller 17.

The drive IC (DIC) and the MCU can transmit and receive signals through a Serial Peripheral Interface (SPI) interface. The MCU carries out a touch recognition algorithm which compares the TDATA with a threshold value, determines a touch input according to the comparison result, and calculates coordinates of the touch input.

With reference to FIG. 5, the driving device includes a drive IC (DIC) and a memory (MEM).

The drive IC (DIC) comprises a touch sensor channel unit 10, Vcom buffer 11, switch array 12, first timing control signal generation unit 13, MUX 14, DTX compensation unit 15, sensing unit 16, second timing controller 17, memory (MEM), and MCU 19. The present embodiment differs from the embodiment of FIG. 4 in that the MCU 19 is integrated into the drive IC (DIC). The MCU 19 carries out a touch recognition algorithm which compares the TDATA with a threshold value, determines a touch input according to the comparison result, and calculates coordinates of the touch input.

The Memory (MEM) stores register configuration values related to timing information required for operation of the display driving circuit and the sensing unit 16. If the display device is turned on, the register configuration values from the memory (MEM) are loaded to the first timing controller 13 and the second timing controller 17. The first timing controller 13 and the second timing controller 17 generates timing control signals for controlling the display driving circuit and the sensing unit 16 based on the register configuration values read from the memory (MEM). A model change can be accommodated by modifying the register configuration values of the memory (MEM) without involving structural modification of the driving device.

Figure 6:
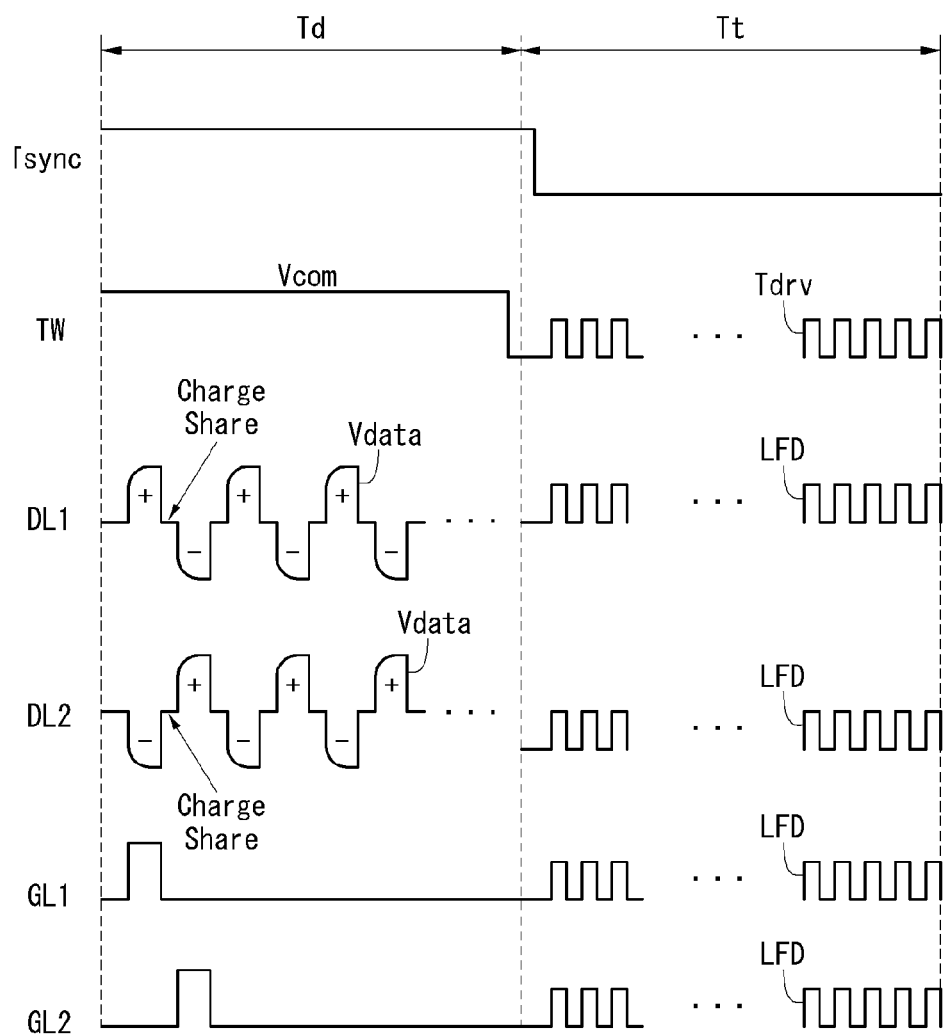
FIG. 6 illustrates an output signal of a driving circuit unit

FIG. 6 illustrates signals output to signal lines by the driving circuit unit.

With reference to FIG. 6, the driving device outputs signals for image display during a display time (Td) and outputs a touch driving signal (Tdrv) and a Load Free Driving signal (LFD) during a touch sensing time (Tt). The driving device provides a common voltage Vcom to the sensing line (TW) during the display time (Td) and provides a touch driving signal (Tdrv) during the touch sensing time (Tt). The driving device provides a data voltage (Vdata) to the data line (DL) during the display time (Td) and provides an alternating LFD signal (LFD) during the touch sensing time (Tt). The driving device provides a gate pulse to the gate line (GL) during the display time (Td). During the touch sensing time (Tt), the driving device provides an alternating LFD signal (LFD) having the same phase with the touch driving signal (Tdrv). The alternating LFD signal (LFD) generates the same voltage as generated by the touch driving signal (Tdrv). The voltage of the touch driving signal (Tdrv) and the alternating LFD signal (LFD) are lower than the common voltage (Vcom). If Load Free Driving Signal (LFD) in the same phase as the touch driving signal (Tdrv) is supplied to the data lines (DLs) and the gate lines (GLs) during the touch sensing time (Tt), the amount of charges in the parasitic capacitor of the display panel can be reduced. This is possible because the amount of charges in the parasitic capacitance can be minimized by minimizing a voltage difference across the parasitic capacitor. As a result, the parasitic capacitance between touch sensors and signal lines (DLs, GLs) can be minimized and sensitivity of touch sensing can be improved.

Figure 7:
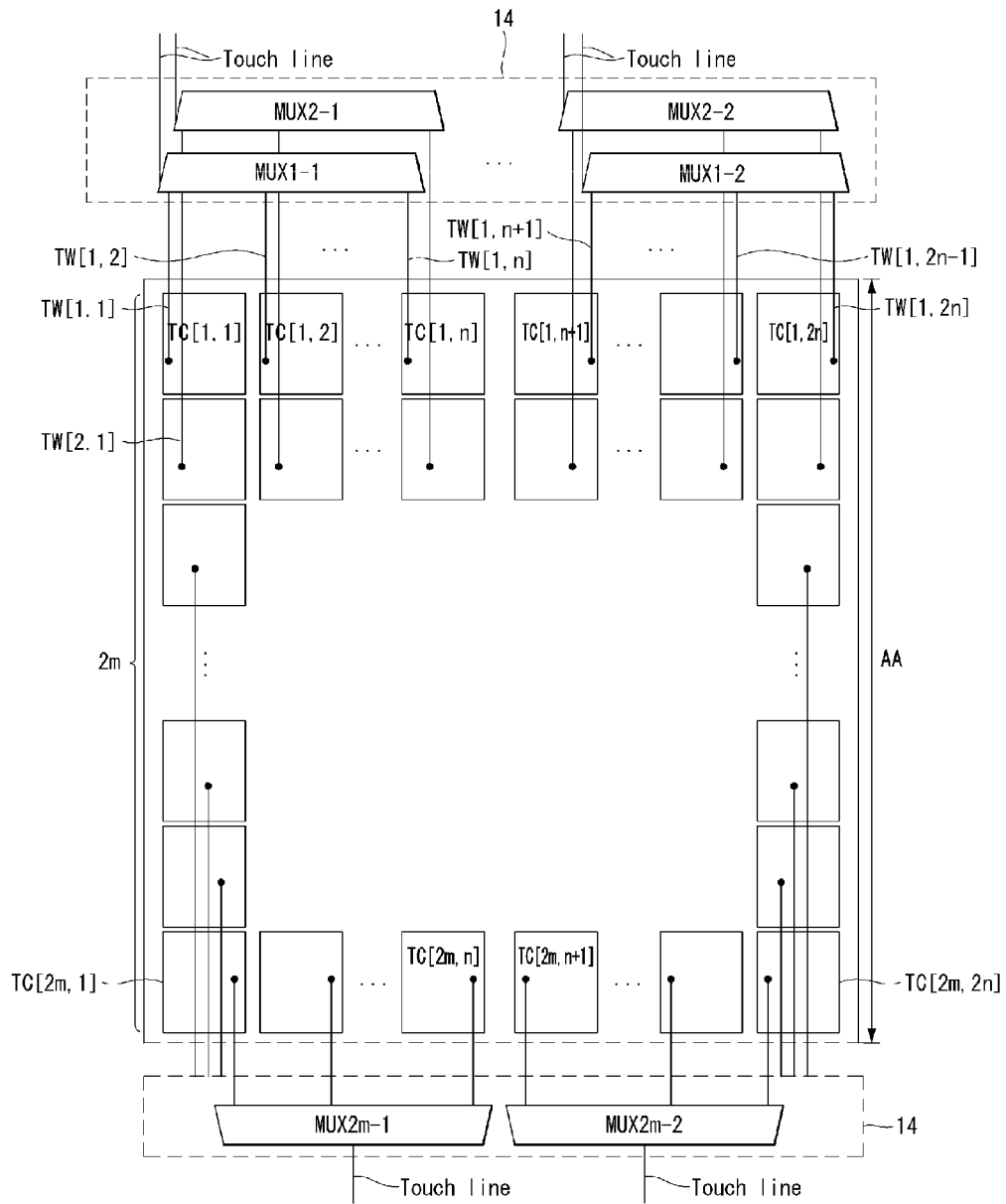
FIG. 7 illustrates a connecting structure between a MUX unit and touch sensors.
Figure 8:
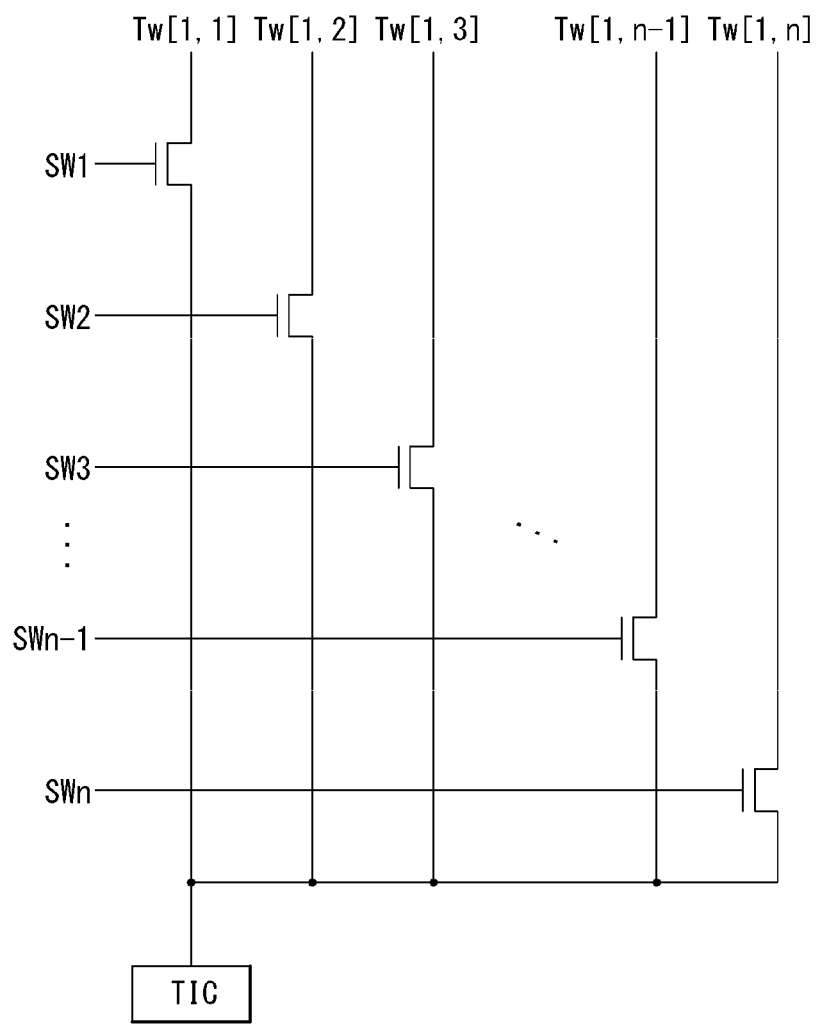
FIGS. 8 and 9 illustrate a structure of switches of a mux unit.

FIGS. 7 and 8 illustrate a connecting structure between a MUX 14 and a sensing line (TW).

With reference to FIGS. 7 and 8, the MUX 14 includes MUX1-1 to MUX2m−1 connected to touch sensors (TC) belonging to a first touch group (T_G1); and MUX1-2 to MUX2m−2 connected to touch sensors (TC) belonging to a second touch group (T_G2). Each MUX can be implemented by n-to1 MUX (where n is a positive integer larger than or equal to 2).

Each MUX reduces the number of channels for the driving device by connecting multiple sensing lines sequentially to one channel of the driving device according to a predetermined order. In what follows, it should be noted that the MUX number or channel number of the driving device is only an example, and the present invention is not limited to the example.

MUX1-1 selects one sensing line from among n sensing lines (TW[1, 1], TW[1, 2], . . . , TW[1, n]) disposed along the first row of the first touch group (T_G1), connects the selected sensing line to the first channel of the driving device through the first touch line, and connects the other sensing lines to the first channel under the control of the driving device according to a predetermined order. MUX2-1 selects one sensing line from among n sensing lines (TW[2, 1], TW[2, 2], . . . , TW[2, n]) disposed along the second row of the first touch group (T_G1), connects the selected sensing line to the second channel of the driving device through the second touch line, and connects the other sensing lines to the second channel under the control of the driving device according to a predetermined order. Likewise, MUX2m−1 selects one sensing line from among n sensing lines (TW[2m, 1], TW[2m, 2], . . . , TW[2m, n]) disposed at the 2m-th row of the first touch group (T_G1), connects the selected sensing line to the 2m-th channel of the driving device through the 2m-th touch line, and connects the other sensing lines to the 2m-th channel under the control of the driving device according to a predetermined order.

MUX1-2 selects one sensing line from among n sensing lines (TW[1, n+1], TW[1, n+2], . . . , TW[1, 2n]) disposed at the first row of the second touch group (T_G2), connects the selected sensing line to the (2m+1)-th channel of the driving device through the (2m+1)-th touch line, and connects the other sensing lines to the (2m+1)-th channel under the control of the driving device according to a predetermined order. MUX2-2 selects one sensing line from among n sensing lines (TW[2, n+1], TW[2, n+2], . . . , TW[2, 2n]) disposed at the second row of the second touch group (T_G2), connects the selected sensing line to the (2m+2)-th channel of the driving device through the (2m+2)-th touch line, and connects the other sensing lines to the (2m+2)-th channel under the control of the driving device according to a predetermined order. Likewise, MUX2m−2 selects one sensing line from among n sensing lines (TW[2m, n+1], TW[2m, n+2], . . . , TW[2m, 2n]) disposed at the 2m-th row of the second touch group (T_G2), connects the selected sensing line to the 4m-th channel of the driving device through the 4m-th touch line, and connects the other sensing lines to the 4m-th channel under the control of the driving device according to a predetermined order.

Each of the 2m MUXes (MUX1-1 to MUX2m−1) responsible for the first touch group (T_G1) drives the touch sensors (TC) belonging to the first touch group (T_G1) sequentially along the direction of the first to the n-th column in response to the first MUX control signal (SW1) to the n-th MUX control signal (SWn) shown in FIG. 8. Each of the 2m MUXes (MUX1-1 to MUX2m−1) responsible for the second touch group (T_G2) drives the touch sensors (TC) belonging to the first touch group (T_G1) sequentially along the direction of the (n+1)-th column to the 2n-th column in response to the first MUX control signal (SW1) to the n-th MUX control signal (SWn) shown in FIG. 8.

Figure 9:
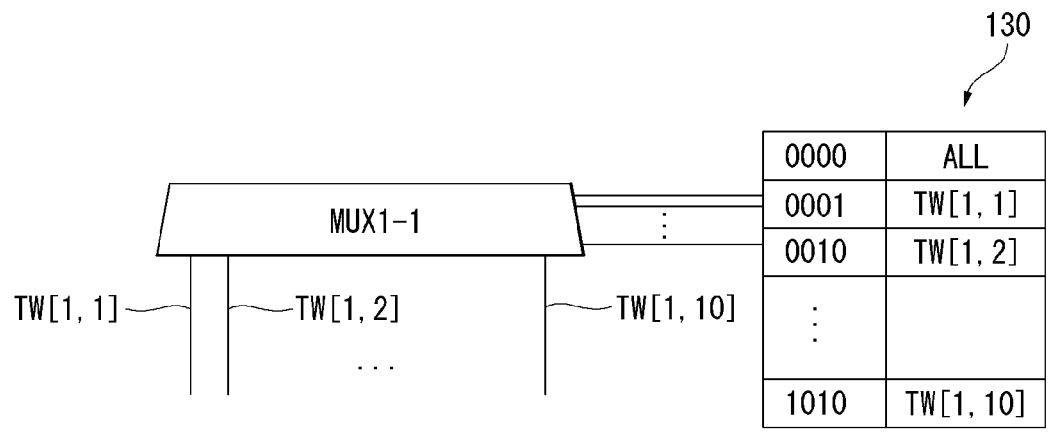

FIG. 8 illustrates the multiplexing circuitry within MUX1-1. Similar circuitry can be found in the other MUXes. Besides the method of using MUX control signals shown in FIG. 8, each of the MUXes can connect one or more sensing lines and the driving circuit unit by using a control signal composed of binary logic values. FIG. 9 illustrates one example of connecting MUX1-1 to 10 sensing lines by using a MUX control signal.

The MUX1-1 shown in FIG. 9 connects one or more sensing lines from among the first to the tenth sensing lines (TW[1, 1], TW[1, 2], . . . TW[1, 10]) disposed in the first row of the first touch group (T_G1) to the touch line sequentially according to a predetermined order. Other MUXes are connected to the driving device through sensing lines according to the same method of FIG. 9. The MUX1-1 selects a sensing line connected to the touch line in response to the MUX control signals from the control signal generation unit 130. The control signal generation unit 130 can generate a 4-bit control signal.

In case the MUX control signal is '0000', the MUX1-1 connects all of the first to the tenth sensing lines (TW[1, 1], TW[1, 2], . . . , TW[1, 10]) to the touch line. And in case the MUX control signal is '0001', the MUX1-1 connects only the first sensing line (TW[1, 1]) to the touch line and in case the MUX control signal is '0010', connects only the second sensing line (TW[1, 2]) to the touch line. In the same way, in case the MUX control signal is '0101', the MUX1-1 connects only the tenth sensing line (TW[1, 10]) to the touch line.

Figure 10:
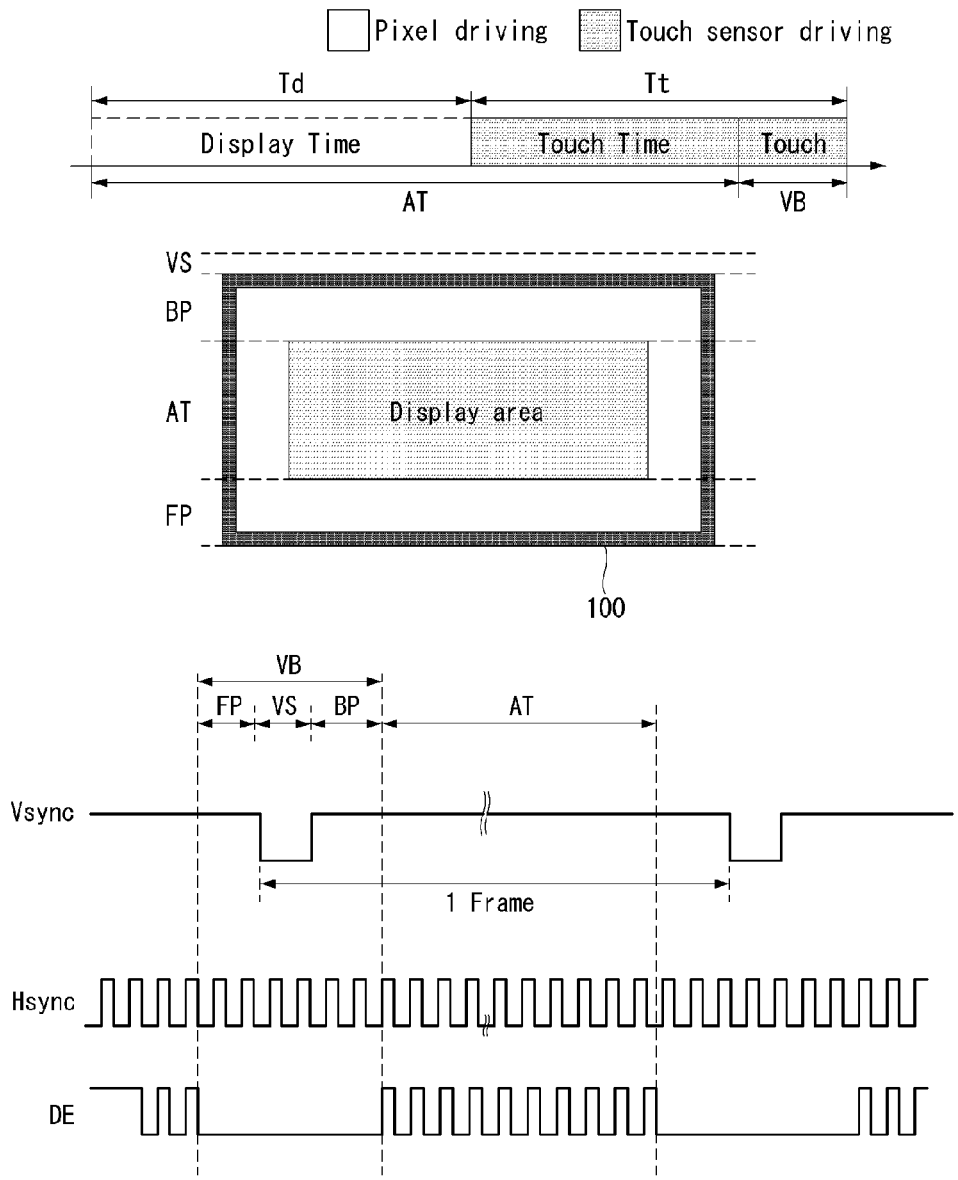
FIG. 10 illustrates a driving method according to a first embodiment.

In addition to the MUX control signal shown in FIG. 9, the control signal generation unit 130 can generate a MUX control signal supporting various logic combinations. FIG. 10 illustrates a driving method of a display device according to a first embodiment.

With reference to FIG. 10, a driving method of a display device according to the first embodiment divides one frame period into a display time (Td) and a touch sensing time (Tt). Part of the touch sensing time Tt is in the vertical active time AT of a frame. Part of the touch sensing time (Tt) is in the vertical blanking interval (VB). Since the display device according to the present invention can utilize the vertical blanking interval (VB) for the touch sensing time, the touch sensing time can be made to be longer than that of the existing technologies. As a result, the present invention can improve touch sensitivity, thereby increasing the touch recognition rate.

Now, the vertical blanking interval (VB) will be described with reference to the display timing diagram specified in the Video Electronics Standards Association (VESA) standard.

The data enable signal (DE) is synchronized with the data of an input image. The period of the data enable signal (DE) for one pulse corresponds to one horizontal time, and the high logic interval of the data enable signal (DE) represents input timing for one horizontal line of data. One horizontal time refers to the time required for writing data to the pixels in one line of the display panel 100.

The data enable signal (DE) and the data of an input image are input during vertical active time (AT), but are not input during the vertical blanking interval (VB). The vertical active time (AT) refers to the time period required to display one frame amount of data through all of the pixels of the display area (AA) in the display panel. One frame period is the time period required for displaying one frame of data on the display panel 100, which amounts to the sum of one vertical active time (AT) and one vertical blanking interval (VB).

As can be known from the data enable signal (DE), the display device does not receive input image data during the vertical blanking interval (VB). The vertical blanking interval (VB) includes vertical sync time (VS), vertical front porch (FP), and vertical back porch (BP). The vertical sync time (VS) refers to the time period ranging from the falling edge of Vsync to the rising edge of Vsync and represents start (or end) timing of one frame. The vertical front porch (FP) refers to the time period ranging from the falling edge of the last DE representing last line data timing of one frame data to the start of the Vsync pulse. The vertical back porch (BP) refers to the time period ranging from the end of the Vsync pulse to the rising edge of the first DE representing the first line data timing of one frame data.

Figure 11:
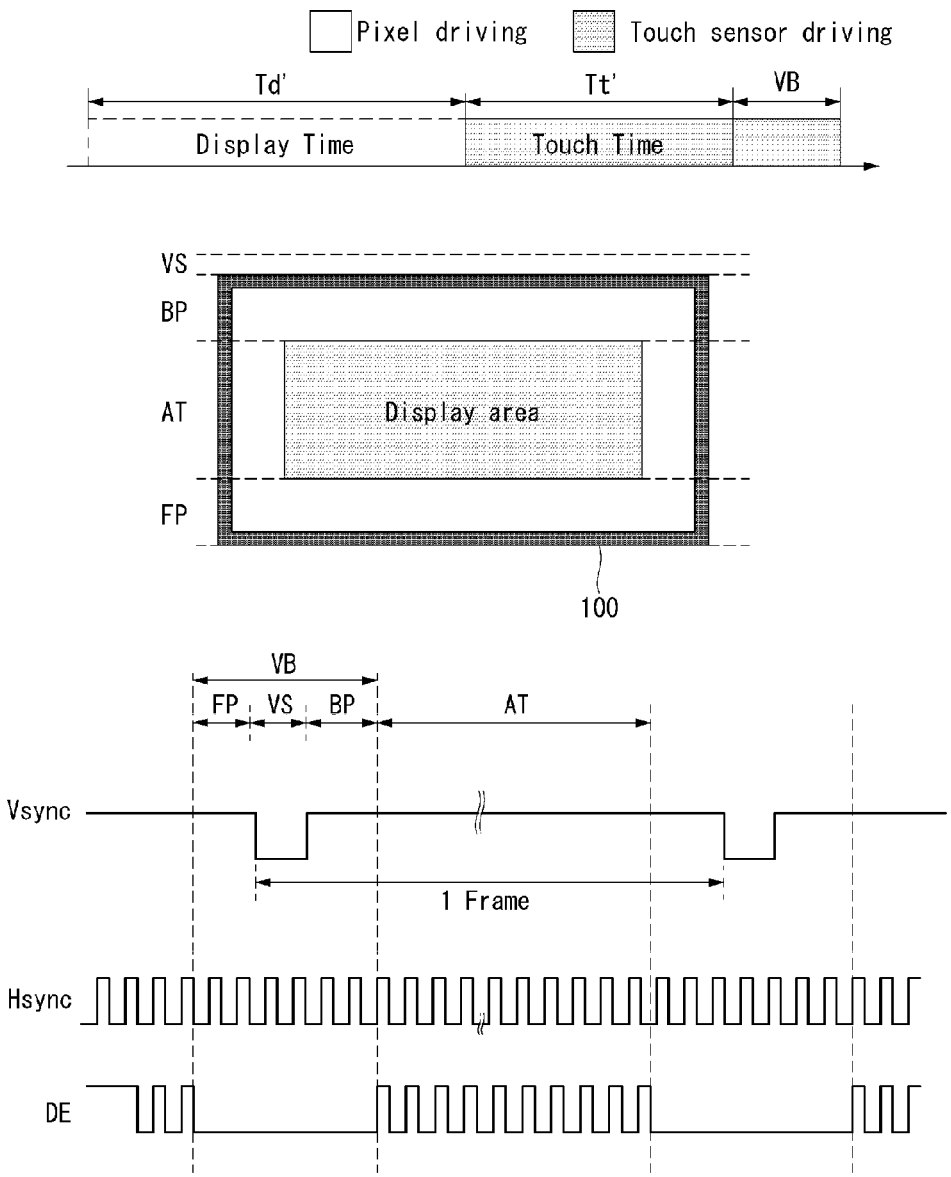
FIG. 11 illustrates a driving method by using a comparative example.

In the first embodiment, at least part of the vertical blanking interval (VB) can be allocated to the touch sensing time under the condition that the display time (Td) and the touch sensing time (Tt) within one frame are the same as in the comparative example of FIG. 11. For example, the whole vertical blanking interval (VB) can be allocated to the touch sensing time, or one or more periods selected from among the vertical front porch (FP), vertical sync time (VS), and vertical back porch (BP) can be allocated to the touch sensing time.

Figure 12:
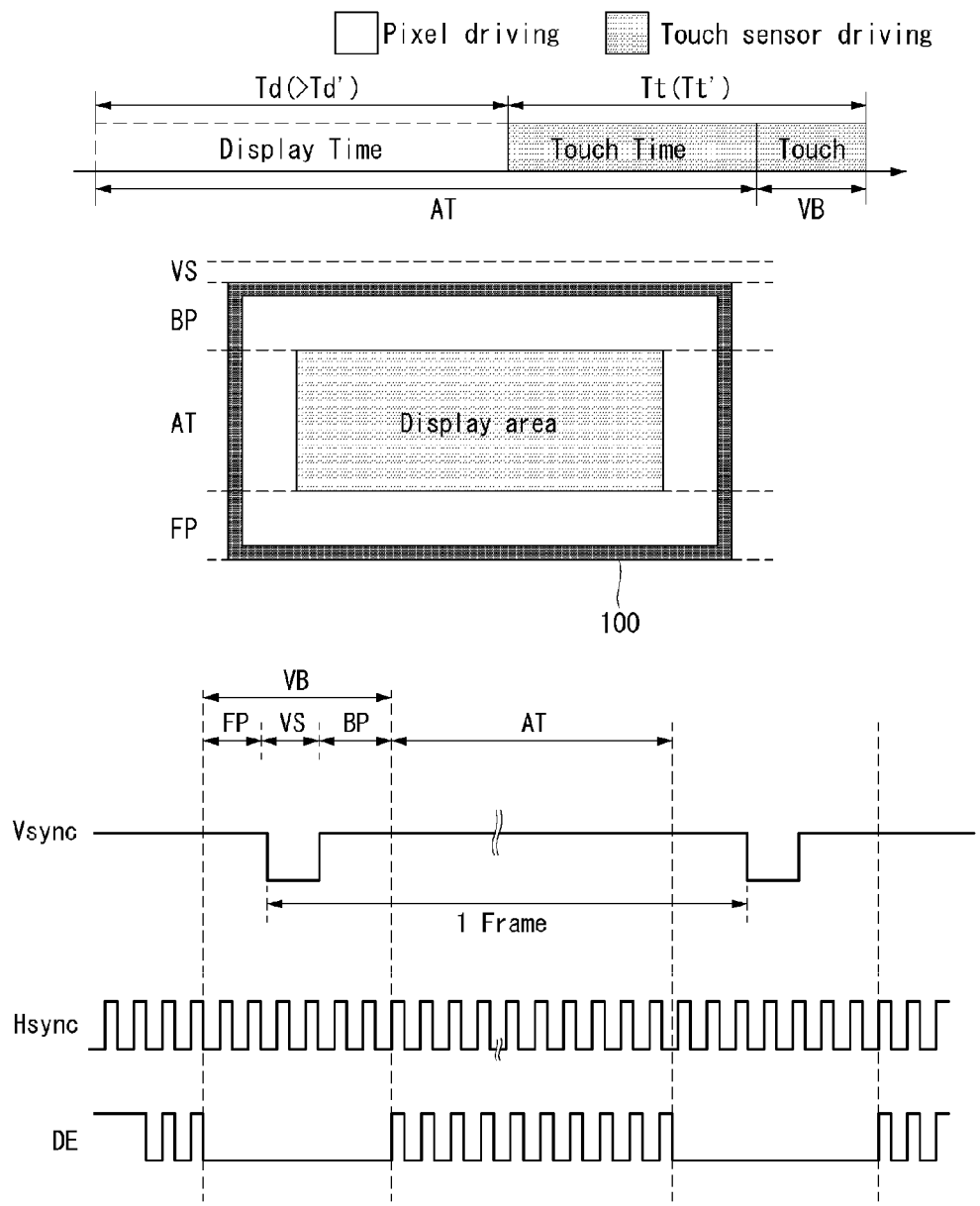
FIG. 12 illustrates a modified example of the driving method of the first embodiment.

Similarly, the time period corresponding to the vertical blanking interval (VB) may be distributed across the display time (Td) and the touch sensing time (Tt). Therefore, as shown in FIG. 12, in case the vertical blanking interval (VB) is distributed to the display time (Td) and the touch sensing time (Tt), the display time (Td) is made to be longer than the display time (Td) of FIGS. 10 and 11. As a result, the embodiment of FIG. 12 can not only increase touch recognition rate but also improve display quality.

FIG. 13 illustrates a driving method for a display device according to a second embodiment.

With reference to FIG. 13, the second embodiment carries out a display time (Td) and a touch sensing time (Tt) in an alternate fashion within one frame period, repeating the respective periods two or more times. And the vertical blanking interval (VB) is utilized for touch sensing during the touch sensing time (Tt).

The display area (AA) of the display panel 100 is divided into first through n-th display blocks (D_Block1-D_Blockn). During each display time (Td), input image display data is driven to the pixels belonging to one display block (D_Block). The first to the n-th display blocks (D_Block1-D_Blockn) may not be of the same size.

The touch sensing area is divided into the first to the n-th touch blocks (T_Block1-T_Blockn). Each of the touch blocks includes two or more touch sensors. The first to the n-th touch block (T_Block1-T_Blockn) may not be of the same size. During each touch sensing time (Tt), touch driving signals are driven to one or more touch blocks. Alternatively, during each touch sensing time (Tt) touch driving signals can be driven to all of the touch blocks of a display panel.

Embodiments of the present disclosure generate a first touch report by completing touch input sensing with respect to the whole touch screen before the first frame period is terminated. The first touch report is generated using the touch driving signals provided to the touch blocks prior to generating the first report. And before the vertical blanking interval (VB) is terminated, the embodiments of the present disclosure can carry out touch input sensing again with respect to the whole touch screen and generate a second touch report within the vertical blanking interval (VB). The second touch report is generated using the touch driving signals provided to the touch blocks after the first report is generated. Each of the first and the second touch reports includes coordinate information of touch inputs and identification codes (IDs) of touch input areas. The first and touch reports are also transmitted to a host system.

In the same way as the embodiment above, since the second embodiment uses the vertical blanking interval (VB) as the touch sensing time (Tt), the touch sensing time can be extended without experiencing drop of pixel charging rate; therefore, image display quality can be improved, thereby increasing touch recognition rate. In particular, since the second embodiment generates a touch report two times within one frame period while carrying out the display time (Td) and the touch sensing time (Tt) in an alternate fashion, touch sensitivity can be enhanced.

Figure 14:
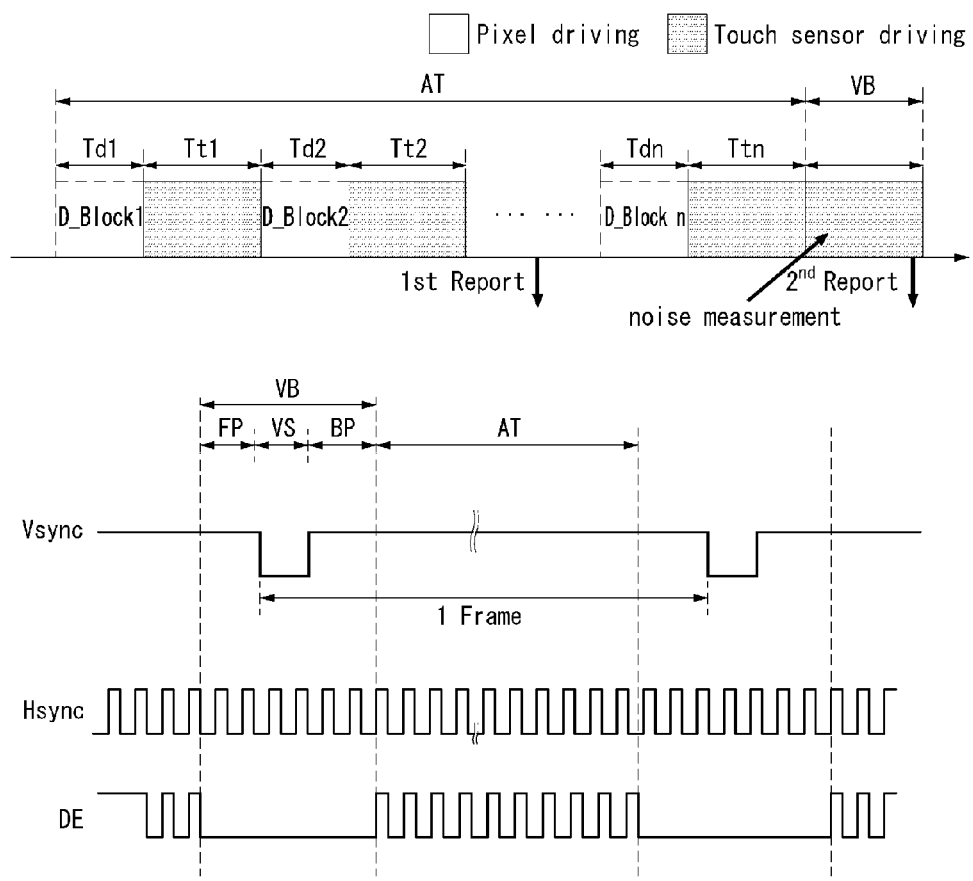
FIG. 14 illustrates a driving method according to a third embodiment.

FIG. 14 illustrates a driving method for a display device according to a third embodiment.

With reference to FIG. 14, the third embodiment carries out a display time (Td) and a touch sensing time (Tt) in an alternate fashion within one frame period, repeating the respective periods two or more times. And the vertical blanking interval (VB) is utilized as a dummy touch time.

The display area (AA) of the display panel 100 is divided into the first to the n-th display blocks (D_Block1-D_Blockn). During each display time (Td), input image data are written to the pixels belonging to one display block (D_Block) for image display. The first to the n-th display block (D_Block1-D_Blockn) may not be of the same size. The touch sensing area is divided into first through n-th touch blocks (T_Block1-T_Blockn), and during each touch sensing time (Tt), one touch block (T_Block) is sensed. The first to the n-th touch block (T_Block1-T_Blockn) may not be of the same size.

A first touch report is transmitted by completing touch sensing with respect to the whole touch screen before the first frame period is terminated. And before the vertical blanking interval (VB) is terminated since the first touch report is produced, touch sensing is carried out again with respect to the whole touch screen, and a second touch report is transmitted.

Since the third embodiment can use the vertical blanking interval (VB) for a noise measurement interval, touch performance can be improved.

The driving device measures noise applied to a touch sensor through a finger or a conductor during the vertical blanking interval (VB) and changes a touch sensor driving frequency in response to the level of the noise.

The driving device senses the amount of charges changed in a touch sensor using the touch sensor driving frequency. The driving device measures the amount of charges, introduced through a finger or a conductor, through the touch sensors during the vertical blanking interval (VB), compares noise proportional to the amount of the charges with previous noise, and measure the level of the noise based on a result of the comparison.

The driving device generates the coordinates of a touch input at a predetermined touch report rate. The driving device may output the noise measurement value of a touch sensor at the report rate of a frequency, such as a touch report rate, but the present invention is not limited thereto.

If it is found from a noise measurement result that current noise is larger than previous noise, the driving device can change frequency of the current noise by using a predetermined frequency change method and drive touch sensors at the frequency where Signal-to-Noise Ratio (SNR) is the largest.

Also, since the third embodiment generates a touch report two times within one frame period and the vertical blanking interval, touch sensitivity can be enhanced.

Figure 15:
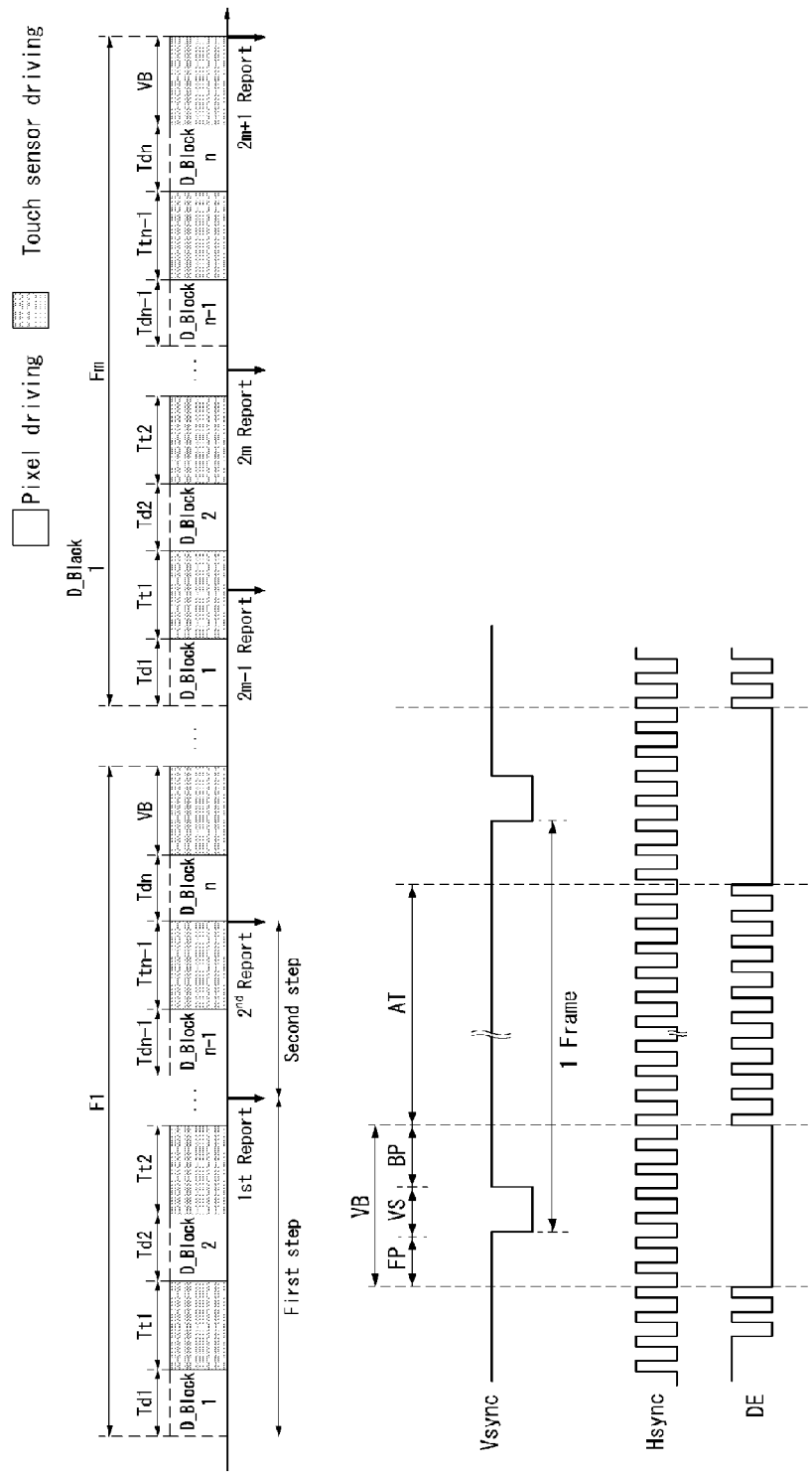
FIG. 15 illustrates a driving method according to a fourth embodiment.

FIG. 15 illustrates a driving method for a display device according to a fourth embodiment.

With reference to FIG. 15, the fourth embodiment carries out a display time (Td) and a touch sensing time (Tt) in an alternate fashion within one frame period, repeating the respective periods two or more times. And the vertical blanking interval (VB) is utilized as a touch sensing time The display area (AA) of the display panel 100 is divided into the first to the n-th display blocks (D_Block1-D_Blockn). During each display time (Td), input image display data are driven to the pixels belonging to one display block (D_Block) is for image display. The first to the n-th display block (D_Block1-D_Blockn) may not be of the same size. The touch sensing area is divided into the first to the n-th touch block (T_Block1-T_Blockn), and during each touch sensing time (Tt), one or more touch blocks (T_Block) are driven with touch driving signals and sensed. The first to the n-th touch block (T_Block1-T_Blockn) may not be of the same size.

A first touch report is transmitted by completing touch sensing with respect to the whole touch screen before the first frame period (F1) is terminated. And a second touch report is produced right after the (n−1)-th touch sensing time (Tt[n−1]). The n-th display block (D_Blockn) displays an image after the second touch report is transmitted. And during the vertical blanking interval (VB) of the first frame period (F1), touch sensing can be carried out for producing a touch report in the next frame. Since a touch report can be produced in the next frame period by using the vertical blanking interval (VB) for the previous frame period, a touch report can be produced three times during the next frame period. In the example of FIG. 15, the touch report is produced three times during the m-th frame period (Fm).

Finally, since the fourth embodiment can produce the (2m+1)-th touch report at the m-th frame (where m=n and is a natural number), touch sensitivity can be enhanced. As can be shown from FIGS. 16 to 20, the driving device of the present invention writes current frame data to the first display area (D_G1) of the display unit (AA) at the first step and produces a first touch simultaneously with driving the first and the second touch groups (T_G1, T_G2) divided from the touch screen report and sensing a touch input while previous frame data are retained in the second display area (D_G2) of the display unit. Next, as can be known from FIGS. 16 to 20, the driving device of the present invention updates a displayed image by writing current frame data to the second display area (D_G2) and generates a second touch report by sensing a touch input by simultaneously driving the first and the second touch groups (T_G1, T_G2).

In what follows, described will be an embodiment which virtually divides a touch screen into a plurality of touch groups, simultaneously drives touch sensors of the touch groups in units of a touch block, and generates a touch report two times or more within one frame period by utilizing the vertical blanking interval as a touch sensing time. A touch block includes two or more touch sensors. A touch group includes two or more touch blocks. In the example of embodiments below, a touch block is divided along a horizontal direction of the touch screen, but the present invention is not limited to the example. For example, a touch block can be divided along a vertical direction.

Figure 16:
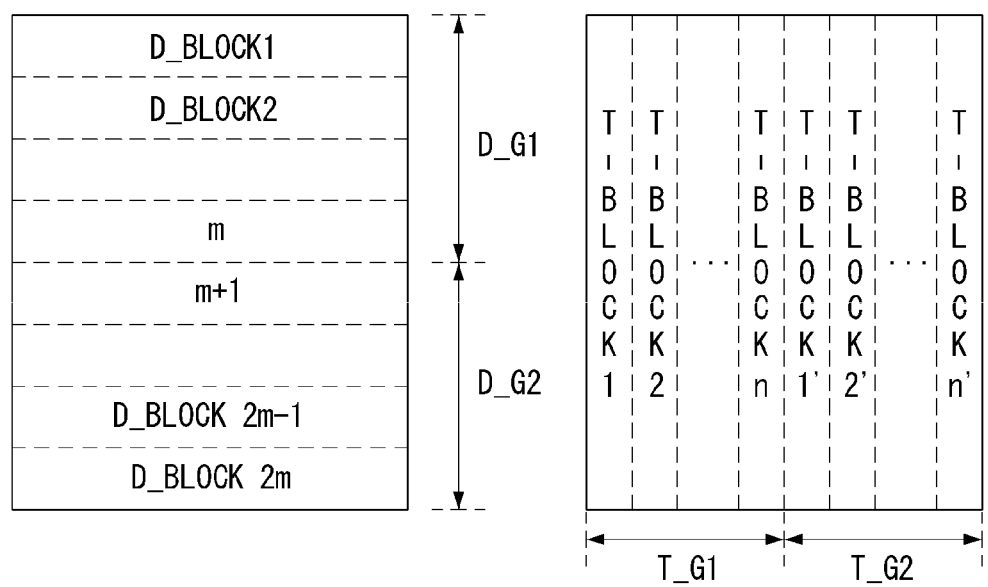
FIG. 16 illustrates a display block and a touch block according to a fifth embodiment.
Figure 17:
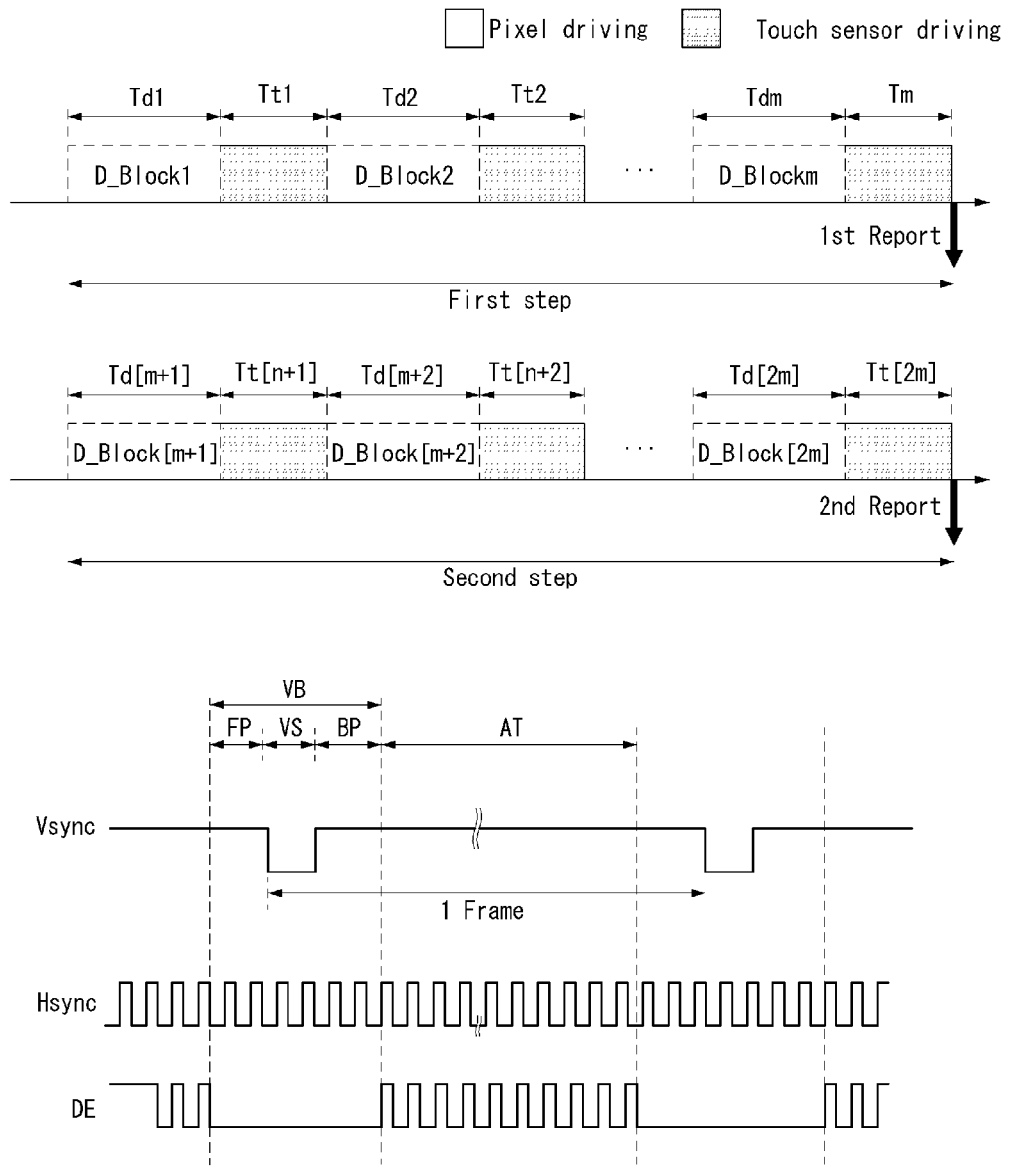
FIG. 17 illustrates a method for driving a display device according to a fifth embodiment.

FIG. 16 illustrates a display block and a touch block according to a fifth embodiment, and FIG. 17 illustrates a method for driving a display device according to a fifth embodiment.

With reference to FIGS. 16 and 17, the display unit (AA) is divided into a first display area (D_G1) and a second display area (D_G2). The first display area (D_G1) and the second display area (D_G2) are not physically divided in the display panel, but denote driving units for block division driving during one display time. The first display area (D_G1) and the second display area (D_G2) include m display blocks (D_BLOCKs) respectively. Each display block includes two or more pixels. The first display area (D_G1) and the second display area (D_G2) can be divided along the column direction (or vertical direction) of the pixel array, but the present invention is not limited to the description above.

The touch screen is divided into a first touch group (T_G1) and a second touch group (T_G2). Touch groups (T_G1, T_G2) can be divided along the horizontal direction of the touch screen. The first touch groups (T_G1) are divided into two or more touch blocks (T_BLOCK_1~n).

The second touch groups (T_G2) are divided into two or more touch blocks (T_BLOCK_1'~n'). As shown in FIG. 16, touch blocks (T_BLOCK_1~n, T_BLOCK_1'~n') can be divided along the horizontal direction of the touch screen, but the present invention is not limited to the description above. Each touch block includes two or more touch sensors. For example, the first touch block (T_BLOCK1) can include touch sensors (TC[1, 1]~TC[2m, 1]) of the first column. The 1'-th touch block (T_BLOCK1') can include touch sensors (TC[1, n+1]-TC[2m, n+1]) of the (n+1)-th column.

w119 The driving device can select touch sensors to drive in units of a touch block (T_BLOCK) by controlling the MUX 14. After driving one or more touch blocks from the first touch group (T_G1) and the second touch group (T_G2) simultaneously during the N-th touch sensing time (where N is a positive integer), the driving device drives other touch blocks in the first touch group (T_G1) and the second touch group (T_G2) simultaneously during the (N+1)-th touch sensing time. The time required for driving the entire touch sensors can be significantly reduced as a plurality of touch groups are driven at the same time according to the method above; therefore, a touch input sensing can be carried out across the whole touch screen in a much shorter time period than those of existing technologies. Furthermore, since the present invention uses the vertical blanking interval (VB) as a touch sensing time, the touch sensing time can be extended, and therefore, a touch input sensing period during which a touch report can be generated two times or more within one frame period can be secured without reducing the display time.

The present invention can repeatedly drive touch sensors of at least part of the touch blocks to uniformly distribute the touch sensing times (Tt) in-between display times (Td), and also in a time period that includes the vertical blanking interval (VB).

Referring to FIG. 17, the method for driving a display device according to the present invention comprises a first step of driving a first display area (D_G1) and generating a first touch report; and a second step of driving a second display area (D_G2) and generating a second touch report.

Pixels of the first display area (D_G1) are driven sequentially in units of a display block (D_BLOCK). The driving device displays an image by writing data of the input image to the pixels of the first display block (D_BLOCK1) during the first display time (Td1). Next, the driving device starts to drive the first and the second touch groups (T_G1, T_G2) simultaneously during the first touch sensing time (Tt1) and senses a touch input from the first and 1'-th touch block (T_BLOCK1, T_BLOCK1') by simultaneously driving the touch sensors thereof. Next, the driving device displays an image by writing the input image data to the pixels of the second display block (D_BLOCK2) during the second display time (Td2). Next, the driving device senses a touch input by driving the second and the 2'-th touch block (T_BLOCK2, T_BLOCK2') simultaneously. By repeating the method above, the driving device generates a first touch report by sensing a touch input across the whole touch screen by driving the entire touch sensors while data are written to the pixels of the first display area (D_G1) at the first step. The first touch report, including coordinate information and touch input identification codes (IDs) of the respective touch inputs, is transmitted to a host system.

After the first touch report is sent, the pixels of the second display area (D_G2) are sequentially driven in units of a display block (D_BLOCK). The driving device displays an image by writing the input image data to the pixels of the (m+1)-th display block (D_BLOCK[m+1]) during the (m+1)-th display time (Td[m+1]). Next, the driving device starts to drive the first and the second touch groups (T_G1, T_G2) simultaneously during the (n+1)-th touch sensing time (Tt[n+1]) and senses a touch input from the first and 1'-th touch block (T_BLOCK1, T_BLOCK1') by simultaneously driving the touch sensors thereof. Next, the driving device displays an image by writing the input image data to the pixels of the (m+2)-th display block (D_BLOCK[m+2]) during the (m+2)-th display time (Td[m+2]). Next, the driving device senses a touch input by driving the second and the 2'-th touch block (T_BLOCK2, T_BLOCK2') simultaneously during the (n+2)-th touch sensing time (Tt[n+2]). By repeating the method above, the driving device generates a second touch report by sensing a touch input across the whole touch screen by driving the entire touch sensors while data are written to the pixels of the second display area (D_G2) at the second step. The second touch report, including coordinate information and touch input identification codes (IDs) of the respective touch inputs, is sent to a host system. The second touch report is generated during the vertical blanking interval (VB). Since the present invention produces a touch report two times within one frame period, touch sensitivity can be enhanced. For example, if the frame rate is 60 Hz, the touch report rate can be 120 Hz or more.

A divided touch sensing time may not be enough as a time period for driving touch sensors belonging to one touch block. For example, each of the first touch sensing time (Tt1) and the second touch sensing time (Tt2) can correspond to the half of the time period required for driving touch sensors of the first touch block (T_BLOCK1). In this case, touch sensors belonging to one touch block (T_BLOCK1) can be driven during the first touch sensing time (Tt1) and the second touch sensing time (Tt2).

The first and the second step are all carried out within one frame including the vertical blanking interval. In the first and the second step, all of the display times (Td) last the same amount of time, and all of the touch sensing times (Tt) are of the same length. For most cases, a display block (D_BLOCK) and a touch block (T_BLOCK) are driven according to a time-division scheme within an image data input period. On the other hand, since the touch sensing time during which touch sensors are driven is extended to the vertical blanking interval (VB), a sufficient period for carrying out touch sensing can be secured.

Figure 18:
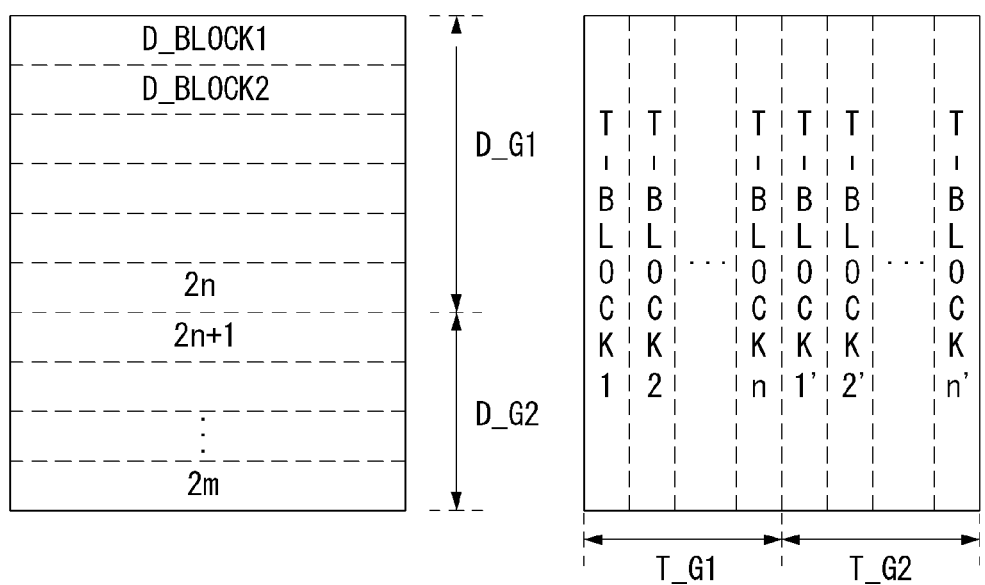
FIG. 18 illustrates a display block and a touch block according to a sixth embodiment.
Figure 19:
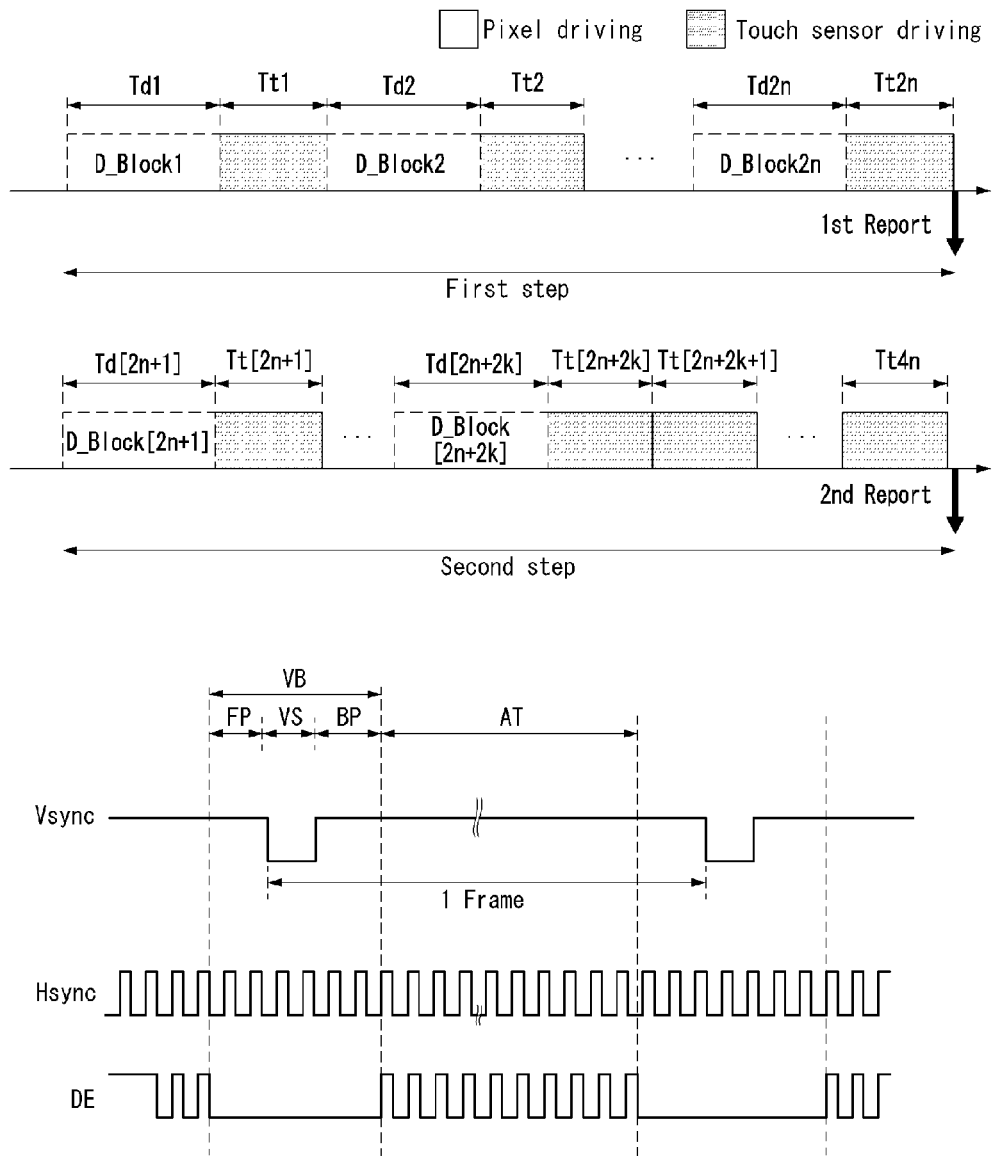
FIG. 19 illustrates a method for driving a display device according to the sixth embodiment.
Figure 20:
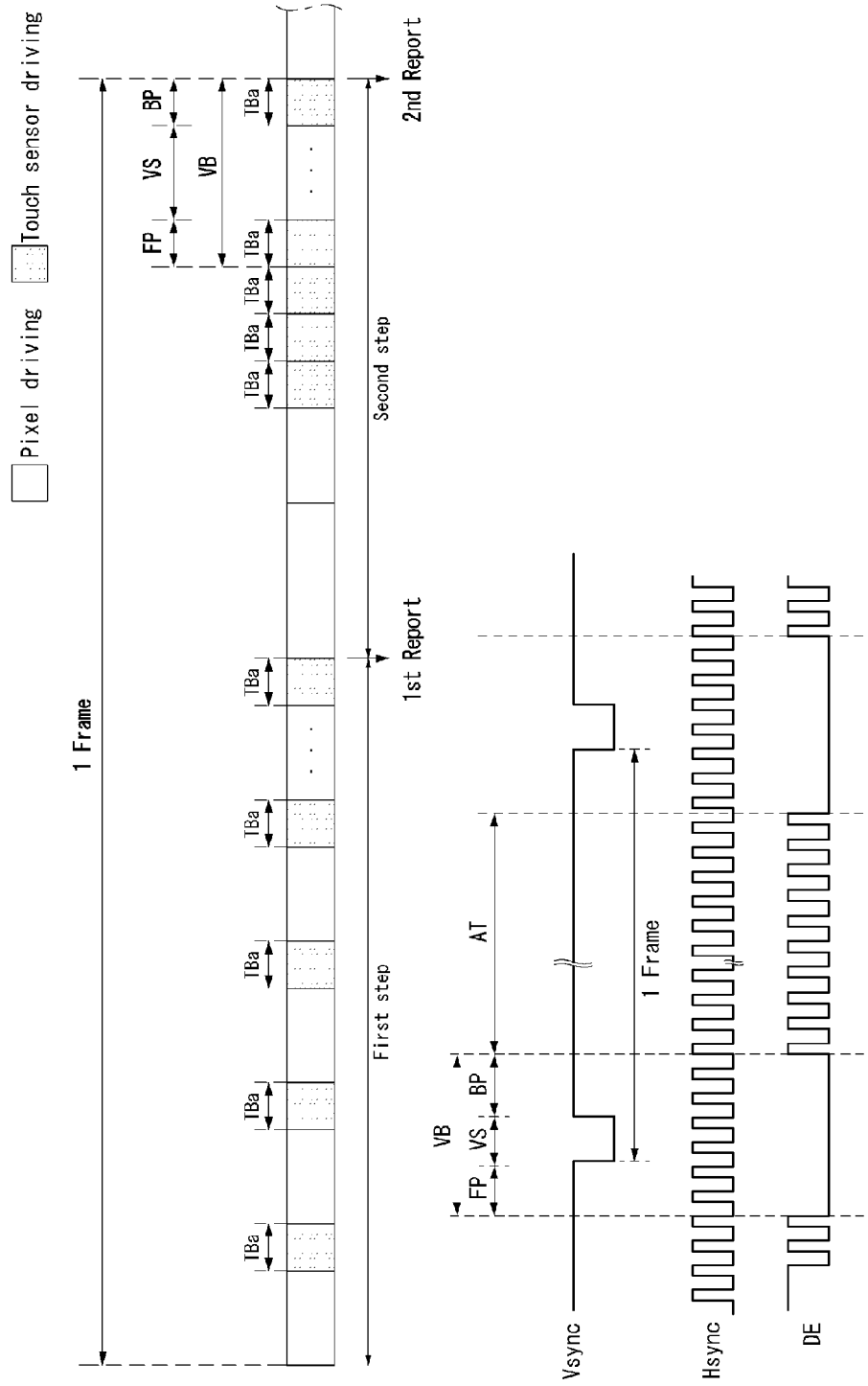
FIG. 20 illustrates one frame period according to the present invention.

FIG. 18 illustrates a display block and a touch block according to a sixth embodiment, and FIG. 19 illustrates a method for driving a display device according to the sixth embodiment. FIG. 20 illustrates one frame period according to the present invention.

With reference to FIGS. 18 to 20, the display unit (AA) is divided into a first display area (D_G1) and a second display area (D_G2). The first display area (D_G1) and the second display area (D_G2) are not physically divided in the display panel, but denote driving units for block division driving during one display time. Each display block includes two or more pixels. The display area (AA) may not be divided into uniform size display areas. For example, the second display area (D_G2) can be set with a size smaller than the first display area (D_G1). In this case, the number of display blocks (D_BLOCK) belonging to the second display area (D_G2) is smaller than the number of display blocks belonging to the first display area (D_G1).

The touch screen is divided into a first touch group (T_G1) and a second touch group (T_G2). The first touch group (T_G1) is divided into two or more touch blocks (T_BLOCK_1~n). The second touch group (T_G2) is divided into two or more touch blocks (T_BLOCK_1'~n'). Each of the touch blocks includes two or more touch sensors.

The driving device can select touch sensors to drive in units of a touch block (T_BLOCK) by controlling the MUX 14. After driving one or more touch blocks from the first touch group (T_G1) and the second touch group (T_G2) simultaneously during the N-th touch sensing time (where N is a positive integer), the driving device drives other touch blocks in the first touch group (T_G1) and the second touch group (T_G2) simultaneously during the (N+1)-th touch sensing time. Since the present invention drives two or more touch groups simultaneously and uses the vertical blanking interval (VB) as a touch sensing time, a sufficiently long touch sensing time can be secured, and therefore, a touch input sensing period during which a touch report can be generated two times or more within one frame period can be secured without reducing the display time.

Referring to FIG. 19, the method for driving a display device according to the present invention comprises a first step of driving a first display area (D_G1) and generating a first touch report; and a second step of driving a second display area (D_G2) and generating a second touch report.

Pixels of the first display area (D_G1) are driven sequentially in units of a display block (D_BLOCK). The driving device displays an image by writing data of the input image to the pixels of the first display block (D_BLOCK1) during the first display time (Td1). Next, the driving device starts to drive the first and the second touch groups (T_G1, T_G2) simultaneously during the first touch sensing time (Tt1) and senses a touch input from the first and 1'-th touch block (T_BLOCK1, T_BLOCK1') by simultaneously driving the touch sensors thereof. Next, the driving device displays an image by writing the input image data to the pixels of the second display block (D_BLOCK2) during the second display time (Td2). Next, the driving device senses a touch input by driving the second and the 2'-th touch block (T_BLOCK2, T_BLOCK2') simultaneously. By repeating the method above, the driving device generates a first touch report by sensing a touch input across the whole touch screen by driving the entire touch sensors while data are written to the pixels of the first display area (D_G1) at the first step. The first touch report, including coordinate information and touch input identification codes (IDs) of the respective touch inputs, is transmitted to a host system.

After the first touch report is sent, the pixels of the second display area (D_G2) are sequentially driven in units of a display block (D_BLOCK). If the size of the second display area (D_G2) is small, the time period occupied by the display time (Td[2n+1], Td[2N+2k]) at the second step is reduced; therefore, a touch sensing time can be further secured by the amount of time reduced in the display time.

The driving device displays an image by writing data of the input image to the pixels of the (2n+1)-th display block (D_BLOCK[2n+1]) during the (2n+1)-th display time (Td [2n+1]). Next, the driving device starts to drive the first and the second touch groups (T_G1, T_G2) simultaneously during the (2n+1)-th touch sensing time (Tt[2n+1]) and senses a touch input from the first and 1'-th touch block (T_BLOCK1, T_BLOCK1') by simultaneously driving the touch sensors thereof. Next, the driving device displays an image by writing the input image data to the pixels of the (2n+2)-th display block (D_BLOCK[2n+2]) during the (2n+ 2)-th display time (Td[2n+2]). Next, the driving device senses a touch input by driving the second and the 2'-th touch block (T_BLOCK2, T_BLOCK2') simultaneously during the (2n+2)-th touch sensing time (Tt[2n+2]). By repeating the method above, the driving device writes input image data to the pixels of the (2n+2k)-th display block (D_BLOCK[2n+2k]) which is the last block of the second display area (D_G2) and then drives touch sensors by using the vertical blanking interval as the touch sensing time (Tt[2n+2k]~Tt[4n]). The driving device writes input image data to the pixels of the second display area (D_G2) at the second step and generates a second touch report by sensing a touch input across the whole touch screen by driving the entire touch sensors. The second touch report, including coordinate information and touch input identification codes (IDs) of the respective touch inputs, is sent to a host system. The second touch report, being generated during the vertical blanking interval (VB), is sent to a host system.

If the number of display blocks (D_BLOCK) of the second display area (D_G2) is 2k (where 1k is a natural number smaller than 2n), the display device drives the k-th touch block (T_BLOCKk) two times during the (2n_2k)-th touch sensing time (Tt[2n+2k]) after the (2n+2k)-th display time (Td[2n+2k]). Since the number of display blocks falls short of four times the number of touch blocks, there remain touch blocks (T_BLOCK) which are not driven at all even if the second display area (D_G2) is completed. At the second step, those not-driven touch blocks (T_BLOCKk, T_BLOCK[k+1], ... , T_BLOCKn) are divided into two and driven twice. In other words, at the second step, after the k-th touch block (T_BLOCKk) is driven during the (2n+2k)-th touch sensing time (Tt[2n+2k]), the (k+1)-th touch block (T_BLOCK[k+1]) to the n-th touch block (T_BLOCK[n]) are divided two times and driven once. After the second step is completed, where the (k+1)-th touch block (T_BLOCK [k+1]) to the n-th touch block (T_BLOCK[n]) are divided two times and driven once, the second touch report is sent to the touch IC (TIC). Since the present invention produces a touch report two times within one frame period, touch sensitivity can be enhanced. For example, if the frame rate is 60 Hz, the touch report rate can be 120 Hz or more.

FIG. 20 illustrates one frame period according to a fifth embodiment. In FIG. 20, TBa denotes a touch sensing time during which the a touch block is driven, and a drawing symbol for a display time has been omitted.

The vertical blanking interval VB can be utilized as a touch sensing time. If the touch sensing time is extended by using the vertical blanking interval VB as described above, touch sensing times can be made to be longer in a uniform manner; therefore, a sufficiently long driving period for each touch sensor can be secured without reducing the display time. Therefore, the present invention can enhance touch sensitivity without reducing the display time. In other words, the present invention can enhance touch sensitivity without degrading image display quality. However, it should be noted that in case a touch report is generated twice within one frame period to improve touch sensitivity, the time required for driving each touch block (T_BLOCK) may not be enough. However, since the present invention is capable of increasing a touch report rate two times or more without suffering shortage of time for driving display blocks, touch input sensing can be carried out in a precise manner while improving touch sensitivity at the same time.

FIGS. 17 and 19 illustrate an embodiment of generating a first touch report by carrying out touch sensing twice with respect to the respective touch blocks during the first step and an embodiment of generating a second touch report by carrying out touch sensing twice with respect to the respective touch blocks during the second step. Since the first and the second touch report can be generated once the condition that all of the touch blocks are sensed at least one or more times is satisfied, there is no need to sense each touch block twice as described in the embodiment above. Therefore, under the condition that the entire touch blocks are sensed at least once, an arbitrary touch block may be sensed three times or more. If the number of group divisions of a touch screen is increased and the number of groups is also increased, the touch report rate can be further improved.

A touch sensor embedded display device according to the present invention produces a touch report two times while one frame of image is being displayed, which improves touch sensitivity.

In particular, since a touch sensor embedded display device according to the present invention can extend a touch sensing time during which an input for a touch block is detected without reducing an image display time, touch sensitivity can be improved without degrading image display quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensitive display device comprising:
   a display panel including a plurality of pixels having at least a first block of pixels, a second block of pixels, the display panel being driven in a first frame period that includes a vertical active period and a vertical blanking period;
   driver circuitry to:
      drive display data to the first block of pixels during a first display period within the vertical active period of the first frame period;
      drive one or more touch driving signals to one or more first touch electrodes during a first touch period that is within the vertical active period and after the first display period of the vertical active period;
      drive display data to the second block of pixels during a second display period that is within the vertical active period and after the first touch period of the vertical active period; and
      drive one or more touch driving signals to one or more second touch electrodes during a second touch period, the second touch period being after the second display period of the vertical active period and having at least a first part occurring in the vertical active period of the first frame period and a second part occurring in the vertical blanking period of the first frame period, wherein the first part of second touch period and the second part of the second touch period are not separated by an intervening display period.

2. The touch sensitive display device of claim 1, wherein the second part of the second touch period occurs during a front porch of the vertical blanking period and/or during a back porch of the vertical blanking period.

3. The touch sensitive display device of claim 2, wherein the second part of the second touch period occurs during the front porch of the vertical blanking period and during the back porch of the vertical blanking period.

4. The touch sensitive display device of claim 1, wherein the second part of the second touch period occurs during a vertical synchronization portion of the vertical blanking period.

5. The touch sensitive display device of claim 1, wherein the first touch electrodes are same as the second touch electrodes.

6. The touch sensitive display device of claim 1, wherein the driver circuitry:
   generates a first touch report based on the touch driving signals driven during the first touch period; and
   generates a second touch report based on the touch driving signals driven during the second touch period, the second touch report generated during the vertical blanking period of the first frame period.

7. The touch sensitive display device of claim 1, wherein the driver circuitry:
   generates a first touch report based on the touch driving signals driven during the first touch period; and
   generates a second touch report based on the touch driving signals driven during the second touch period, the second touch report generated during a second frame period that follows the first frame period.

8. The touch sensitive display device of claim 1, wherein the driver circuitry:
   drives the touch driving signals simultaneously to both the one or more first touch electrodes and one or more second touch electrodes during the first touch period; and
   drives the touch driving signals simultaneously to both the one or more first touch electrodes and the one or more second touch electrodes during the second touch period.

9. The touch sensitive display device of claim 1, wherein the driving circuitry drives the one or more touch driving signals to all touch electrodes of the display panel during the first touch period, and wherein the driving circuitry drives the one or more touch driving signals to all touch electrodes of the display panel during the second touch period.

10. The touch sensitive display device of claim 1, wherein the vertical blanking period corresponds to a period of time in the first frame period when input image data is not received by the touch sensitive display device, and the vertical active period corresponds to a remainder of the first frame period other than the vertical blanking period.

11. The touch sensitive display device of claim 1, wherein the driver circuitry drives a common voltage to at least one of the first touch electrodes and the second touch electrodes during the first display period, and the driver circuitry drives the common voltage to the at least one of the first touch electrodes and the second touch electrodes during the second display period.

12. A driver circuit for a touch sensitive display device that includes a display panel having a plurality of pixels including at least a first block of pixels and a second block of pixels, the display panel being driven in a first frame period that includes a vertical active period and a vertical blanking period, the driver circuit comprising:
   circuitry to:
      drive display data to the first block of pixels during a first display period within the vertical active period of the first frame period;
      drive one or more touch driving signals to one or more first touch electrodes during a first touch period that is within the vertical active period and after the first display period of the vertical active period;

drive display data to the second block of pixels during a second display period that is within the vertical active period and after the first touch period of the vertical active period; and drive one or more touch driving signals to one or more second touch electrodes during a second touch period, the second touch period being after the second display period of the vertical active period and having at least a first part occurring in the vertical active period of the first frame period and a second part occurring in the vertical blanking period of the first frame period, wherein the first part of second touch period and the second part of the second touch period are not separated by an intervening display period.

13. The driver circuit of claim 12, wherein the second part of the second touch period occurs during a front porch of the vertical blanking period and/or during a back porch of the vertical blanking period.

14. The driver circuit of claim 12, wherein the second part of the second touch period occurs during a vertical synchronization portion of the vertical blanking period.

15. The driver circuit of claim 12, wherein the first touch electrodes are same as the second touch electrodes.

16. The driver circuit of claim 12, wherein the circuitry:
generates a first touch report based on the touch driving signals driven during the first touch period; and
generates a second touch report based on the touch driving signals driven during the second touch period, the second touch report generated during the vertical blanking period of the first frame period.

17. The driver circuit of claim 12, wherein the circuitry:
generates a first touch report based on the touch driving signals driven during the first touch period; and
generates a second touch report based on the touch driving signals driven during the second touch period, the second touch report generated during a second frame period that follows the first frame period.

18. The driver circuit of claim 12, wherein the circuitry:
drives the touch driving signals simultaneously to both the one or more first touch electrodes and the one or more second touch electrodes during the first touch period; and
drives the touch driving signals simultaneously to both the one or more first touch electrodes and the one or more second touch electrodes during the second touch period.

19. The driver circuit of claim 12, wherein the driving circuitry drives the one or more touch driving signals to all touch electrodes of the display panel during the first touch period, and wherein the driving circuitry drives the one or more touch driving signals to all touch electrodes of the display panel during the second touch period.

20. The driver circuit of claim 12, wherein the vertical blanking period corresponds to a period of time in the first frame period when input image data is not received by the touch sensitive display device, and the vertical active period corresponds to a remainder of the first frame period other than the vertical blanking period.

21. A method of operating a touch sensitive display device that includes a plurality of pixels having at least a first block of pixels and a second block of pixels, the touch sensitive display device driven in a first frame period that includes a vertical active period and a vertical blanking period, the method comprising:
driving display data to the first block of pixels during a first display period within the vertical active period;

driving one or more touch driving signals to one or more first touch electrodes during a first touch period within the vertical active period of the first frame period;

driving display data to the second block of pixels during a second display period that is within the vertical active period and after the first display period of the vertical active period; and driving one or more touch driving signals to one or more second touch electrodes during a second touch period, the second touch period being after the second display period of the vertical active period and having at least a first part occurring in the vertical active period of the first frame period and a second part occurring in the vertical blanking period of the first frame period, wherein the first part of second touch period and the second part of the second touch period are not separated by an intervening display period.

22. The method of claim 21, wherein the second part of the second touch period occurs during a front porch of the vertical blanking period and/or during a back porch of the vertical blanking period.

23. The method of claim 21, wherein the second part of the second touch period occurs during a vertical synchronization portion of the vertical blanking period.

24. The method of claim 21, wherein the first touch electrodes are same as the second touch electrodes.

25. The method of claim 21, further comprising:
generating a first touch report based on the touch driving signals driven during the first touch period; and
generating a second touch report based on the touch driving signals driven during the second touch period, the second touch report generated during the vertical blanking period of the first frame period.

26. The method of claim 21, further comprising:
generating a first touch report based on the touch driving signals driven during the first touch period; and
generating a second touch report based on the touch driving signals driven during the second touch period, the second touch report generated during a second frame period that follows the first frame period.

27. The method of claim 21, further comprising:
driving the touch driving signals simultaneously to both the one or more first touch electrodes and the one or more second touch electrodes during the first touch period; and
driving the touch driving signals simultaneously to both the one or more first touch electrodes and the one or more second touch electrodes during the second touch period.

28. The method of claim 21, wherein the one or more touch driving signals are driven to all touch electrodes of the display panel during the first touch period, and wherein the one or more touch driving signals are driven to all touch electrodes of the display panel during the second touch period.

29. The method of claim 21, wherein the vertical blanking period corresponds to a period of time in the first frame period when input image data is not received by the touch sensitive display device, and the vertical active period corresponds to a remainder of the first frame period other than the vertical blanking period.

* * * * *